(12) United States Patent
Baek et al.

(10) Patent No.: US 12,707,424 B2
(45) Date of Patent: Aug. 11, 2026

(54) NETWORK-BASED POSITIONING METHOD USING RELAY IN NR-V2X SYSTEM, AND DEVICE THEREFOR

(71) Applicant: LG ELECTRONICS INC., Seoul (KR)

(72) Inventors: Jongseob Baek, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 560 days.

(21) Appl. No.: 18/026,782

(22) PCT Filed: Apr. 12, 2021

(86) PCT No.: PCT/KR2021/004550
§ 371 (c)(1),
(2) Date: Mar. 16, 2023

(87) PCT Pub. No.: WO2022/059876
PCT Pub. Date: Mar. 24, 2022

(65) Prior Publication Data

US 2024/0031975 A1 Jan. 25, 2024

(30) Foreign Application Priority Data

Sep. 17, 2020 (KR) ........................ 10-2020-0119615
Sep. 17, 2020 (KR) ........................ 10-2020-0119624

(51) Int. Cl.
*G01S 5/14* (2006.01)
*G01S 5/00* (2006.01)
(Continued)

(52) U.S. Cl.
CPC ......... *H04W 64/003* (2013.01); *G01S 5/0072* (2013.01); *G01S 5/0236* (2013.01); *G01S 5/14* (2013.01)

(58) Field of Classification Search
CPC .. H04W 64/003; G01S 5/0072; G01S 5/0236; G01S 5/14
(Continued)

(56) References Cited

U.S. PATENT DOCUMENTS 10,149,121 B2 * 12/2018 Kim ...................... H04W 72/23
10,327,106 B2 * 6/2019 Hwang ................. H04W 4/029
(Continued)

FOREIGN PATENT DOCUMENTS

EP 3133842 A1 * 2/2017 ........... H04W 72/23
KR 10-1234177 2/2013
(Continued)

OTHER PUBLICATIONS

Enhanced 5G V2X services using sidelink device-to-device communications—2018 (Year: 2018).*
(Continued)

*Primary Examiner* — Rafael Pérez-Gutiérrez
*Assistant Examiner* — Aaron C. Deditch
(74) *Attorney, Agent, or Firm* — LEE, HONG, DEGERMAN, KANG & WAIMEY

(57) ABSTRACT

The present disclosure relates to a method for performing positioning in a new radio-vehicle to everything (NR-V2X) system, and a device therefor. A method for performing network-based positioning in a new radio-vehicle to everything (NR-V2X) communication system according to an aspect may comprise the steps of determining whether positioning using a relay is required, on the basis of whether there is performance deterioration in positioning of a terminal; determining at least one relay terminal to be used as an anchor node for positioning of the terminal when the positioning using the relay is required; requesting terminal assistant measurement information for the positioning of the terminal from the relay terminal; receiving the terminal
(Continued)

assistant measurement information from the relay terminal; and measuring an absolute position of the terminal on the basis of the terminal assistant measurement information.

12 Claims, 22 Drawing Sheets

(51) Int. Cl.
*G01S 5/02* (2010.01)
*H04W 64/00* (2009.01)

(58) Field of Classification Search
USPC .......................................................... 455/456.1
See application file for complete search history.

(56) References Cited

U.S. PATENT DOCUMENTS 10,390,293 B2* 8/2019 Thyagarajan ......... H04W 48/16
10,966,209 B2* 3/2021 Edge ..................... H04W 4/029
11,425,676 B2* 8/2022 Zhang ....................... G01S 5/14
11,510,174 B2* 11/2022 Cha ....................... H04L 5/0091
11,903,026 B2* 2/2024 Baek ................... H04W 56/004
11,943,739 B2* 3/2024 Cha ....................... G01S 5/0268
12,068,991 B2* 8/2024 Baek ..................... H04L 5/0094
12,095,691 B2* 9/2024 Cha ................... H04W 56/0005
12,143,955 B2* 11/2024 Lee ....................... G01S 5/0072
12,156,130 B2* 11/2024 Baek ..................... H04W 64/00
12,164,047 B2* 12/2024 Baek ..................... H04L 5/0051
2014/0256352 A1* 9/2014 Kim ...................... G01S 5/0226
455/456.1
2017/0150330 A1* 5/2017 Kim ...................... H04W 76/10
2018/0287866 A1* 10/2018 Yoon .................... H04B 17/318
2019/0116567 A1* 4/2019 Zhang ................. H04L 27/2607
2020/0367193 A1* 11/2020 Cha ....................... G01S 5/0236

FOREIGN PATENT DOCUMENTS

| KR | 10-2016-0140756 | 12/2016 |
|---|---|---|
| WO | 2016186388 | 11/2016 |

OTHER PUBLICATIONS

Physical Layer Evaluation of V2X Communications Technologies 5G NR-V2X LTE-V2X—2019 (Year: 2019).*
Use Cases and Standardisation Activities for eMBB and V2X_ Scenarios—2020 (Year: 2020).*
ETSI TR 137 985 v16.0.0—Jul. 2020 (Year: 2020).*
5g-synchronization-requirements-and-solutions—Jan. 2021 (Year: 2021).*
PCT International Application No. PCT/KR2021/004550, Written Opinion of the International Searching Authority dated Jul. 28, 2021, 17 pages.
3rd Generation Partnership Project; Technical Specification Group Radio Access Network; LTE Positioning Protocol (LPP) (Release 16), 3GPP TS 37.355 v16.1.0, Jul. 2020, 292 pages.
Fraunhofer IIS, Fraunhofer HHI, Study on NR Sidelink Positioning, 3GPP TSG RAN Meeting #88e, RP-201062, Jul. 2020, 3 pages.

* cited by examiner

FIG. 6
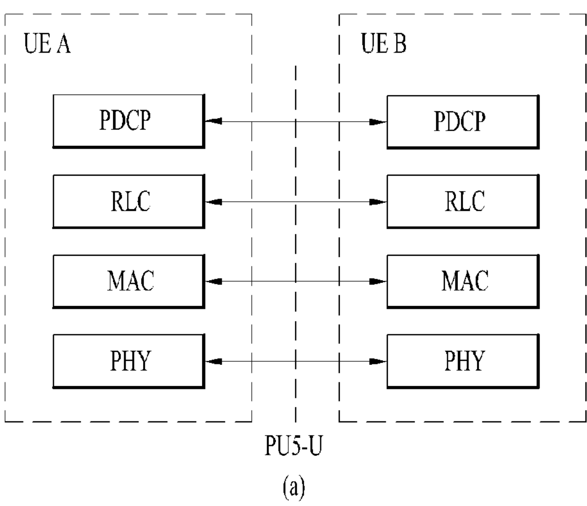
(a)
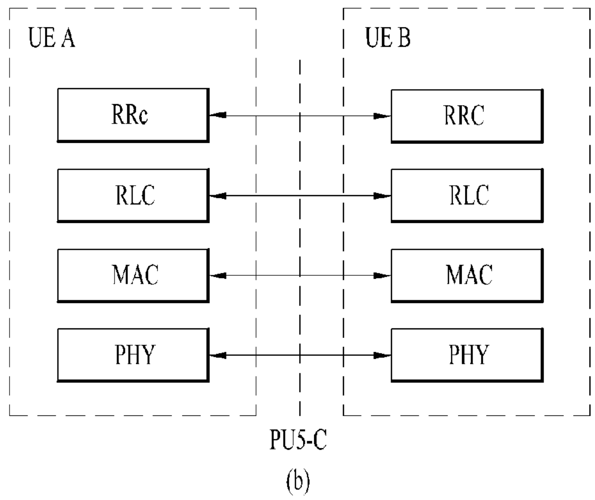
(b)

FIG. 7
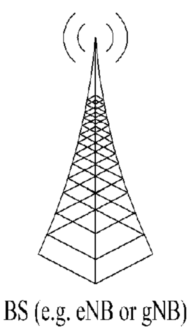
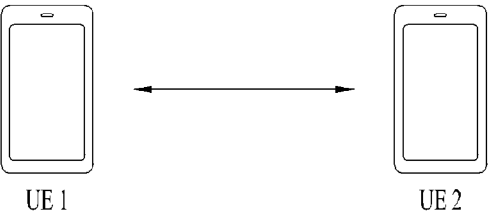

FIG. 10

E-SMLC
SLP
LMF
NLs
AMF
NG-C (Note 2)
NG-C (Note 2)
TP
ng-eNB (Note 1)
TP
Xn
gNB (Note 1)
NG-RAN
LTE-Uu
NR-Uu
UE
SET

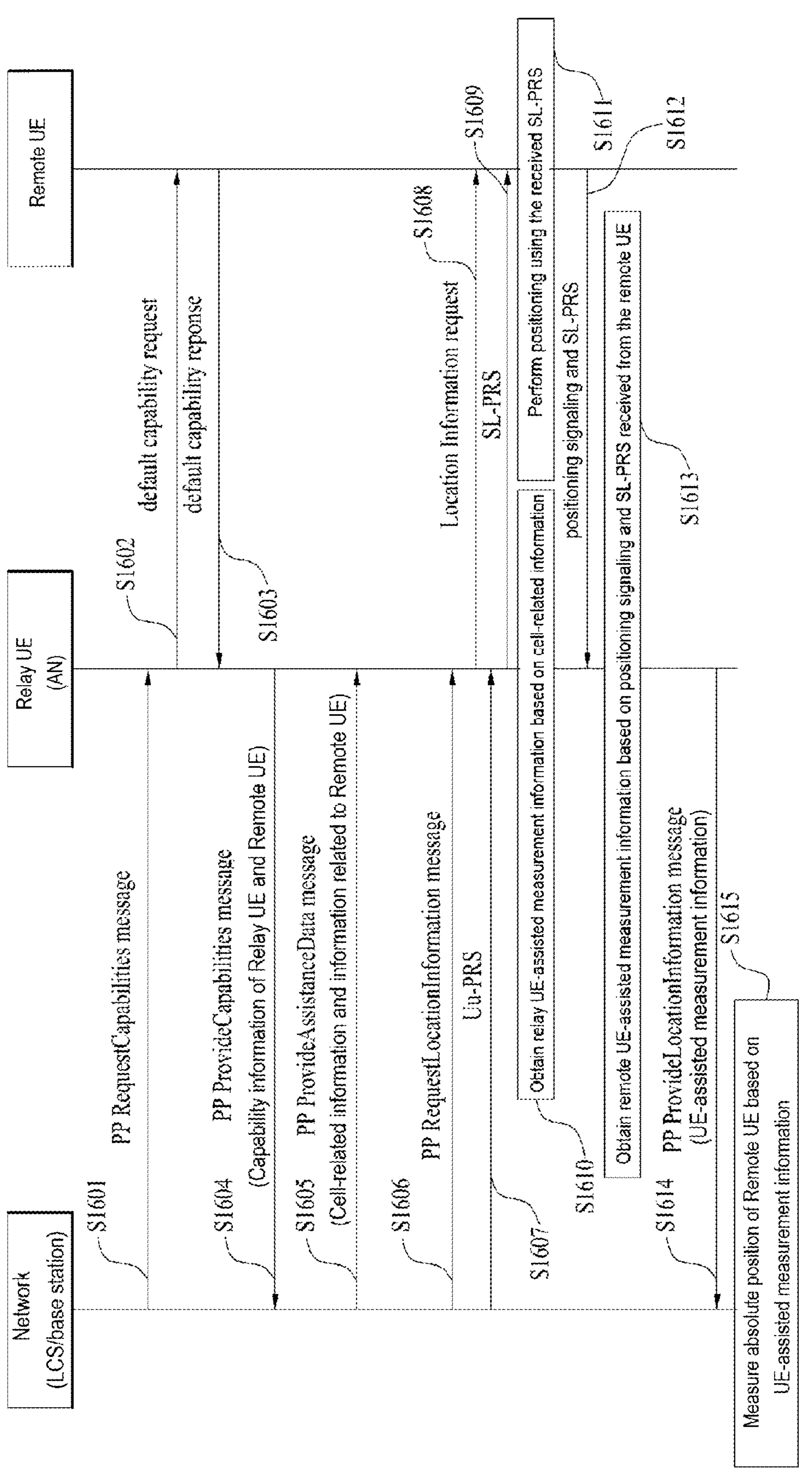
FIG. 16
Network (LCS/base station)
Relay UE (AN)
Remote UE
S1601
PP RequestCapabilities message
S1602
default capability request
S1603
default capability reponse
S1604
PP ProvideCapabilities message
(Capability information of Relay UE and Remote UE)
S1605
PP ProvideAssistanceData message
(Cell-related information and information related to Remote UE)
S1606
PP RequestLocationInformation message
S1607
Uu-PRS
S1608
Location Information request
S1609
SL-PRS
S1610
Obtain relay UE-assisted measurement information based on cell-related information
S1611
Perform positioning using the received SL-PRS
S1612
positioning signaling and SL-PRS
S1613
Obtain remote UE-assisted measurement information based on positioning signaling and SL-PRS received from the remote UE
S1614
PP ProvideLocationInformation message
(UE-assisted measurement information)
S1615
Measure absolute position of Remote UE based on UE-assisted measurement information

NETWORK-BASED POSITIONING METHOD USING RELAY IN NR-V2X SYSTEM, AND DEVICE THEREFOR

CROSS-REFERENCE TO RELATED APPLICATIONS

This application is the National Stage filing under 35 U.S.C. 371 of International Application No. PCT/KR2021/004550, filed on Apr. 12, 2021, which claims the benefit of earlier filing date and right of priority to Korean Application Nos. 10-2020-00119615, filed on Sep. 17, 2020, and 10-2020-0119624, filed on Sep. 17, 2020, the contents of which are all incorporated by reference herein in their entirety.

TECHNICAL FIELD

Embodiments of the present disclosure relate to a network-based positioning, and more particularly to technology for performing network-based positioning using a relay in a New Radio-Vehicle to Everything (NR-V2X) system.

BACKGROUND

Wireless communication systems have been widely deployed to provide various types of communication services such as voice or data. In general, a wireless communication system is a multiple access system that supports communication of multiple users by sharing available system resources (a bandwidth, transmission power, etc.). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multi carrier frequency division multiple access (MC-FDMA) system.

A sidelink (SL) refers to a communication method in which a direct link is established between user equipment (UE), and voice or data is directly exchanged between UEs without going through a base station (BS). SL is being considered as one way to solve the burden of the base station due to the rapidly increasing data traffic.

V2X (vehicle-to-everything) refers to a communication technology that exchanges information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive Machine Type Communication (MTC), and Ultra-Reliable and Low Latency Communication (URLLC) may be referred to as new radio access technology (RAT) or new radio (NR). Even in NR, vehicle-to-everything (V2X) communication may be supported.

FIG. 1 is a diagram comparing RAT-based V2X communication before NR with NR-based V2X communication.

Regarding V2X communication, in RAT prior to NR, a scheme for providing a safety service based on V2X messages such as a basic safety message (BSM), a cooperative awareness message (CAM), and a decentralized environmental notification message (DENM) was mainly discussed. The V2X message may include location information, dynamic information, and attribute information. For example, the UE may transmit a periodic message type CAM and/or an event triggered message type DENM to another UE.

For example, the CAM may include dynamic state information about a vehicle such as direction and speed, vehicle static data such as dimensions, and basic vehicle information such as external lighting conditions and route details. For example, a UE may broadcast the CAM, and the CAM latency may be less than 100 ms. For example, when an unexpected situation such as a breakdown of the vehicle or an accident occurs, the UE may generate a DENM and transmit the same to another UE. For example, all vehicles within the transmission coverage of the UE may receive the CAM and/or DENM. In this case, the DENM may have a higher priority than the CAM.

Regarding V2X communication, various V2X scenarios have been subsequently introduced in NR. For example, the various V2X scenarios may include vehicle platooning, advanced driving, extended sensors, and remote driving.

For example, based on vehicle platooning, vehicles may dynamically form a group and move together. For example, to perform platoon operations based on vehicle platooning, vehicles belonging to the group may receive periodic data from a leading vehicle. For example, the vehicles belonging to the group may reduce or increase the distance between the vehicles based on the periodic data.

For example, based on advanced driving, a vehicle may be semi-automated or fully automated. For example, each vehicle may adjust trajectories or maneuvers based on data acquired from local sensors of nearby vehicles and/or nearby logical entities. Also, for example, each vehicle may share driving intention with nearby vehicles.

For example, on the basis of extended sensors, raw data or processed data acquired through local sensors, or live video data may be exchanged between a vehicle, a logical entity, UEs of pedestrians and/or a V2X application server. Thus, for example, the vehicle may recognize an environment that is improved over an environment that may be detected using its own sensor.

For example, for a person who cannot drive or a remote vehicle located in a dangerous environment, a remote driver or V2X application may operate or control the remote vehicle based on remote driving. For example, when a route is predictable as in the case of public transportation, cloud computing-based driving may be used to operate or control the remote vehicle. For example, access to a cloud-based back-end service platform may be considered for remote driving.

When the NR-V2X system performs UE-to-UE sidelink positioning or UE-to-AN (Anchor Node) sidelink positioning, the NR-V2X system can effectively provide positioning-related control information.

Sidelink positioning may be used for positioning between vehicles. For vehicle safety, it is necessary to provide high-reliability information between vehicles. In addition, positioning control information must be efficiently provided in consideration of various factors affecting positioning.

SUMMARY

An object of the present disclosure is to provide a method for performing network-based positioning using a relay in a New Radio-Vehicle to Everything (NR-V2X) system and a device for the same.

Another object of the present disclosure is to provide a positioning protocol for performing network-based positioning using a Uu link and a sidelink.

Another object of the present disclosure is to provide a network-based positioning method capable of adaptively providing various positioning methods based on a positioning service type, positioning capabilities of a UE and a relay, the number of available anchor nodes (ANs), change in the surrounding environment, etc., thereby providing a positioning solution optimized for the UE and network situations, and to provide a device for the network-based positioning method.

Another object of the present disclosure is to provide a network-based positioning method using a relay in the NR-V2X positioning system that can effectively improve positioning performance of a remote UE having deteriorated positioning performance through cooperation with a relay UE without additional network expansion, and to provide a device for the network-based positioning method.

It will be appreciated by persons skilled in the art that the objects that could be achieved with the various embodiments of the present disclosure are not limited to what has been particularly described hereinabove and the above and other objects that the various embodiments of the present disclosure could achieve will be more clearly understood from the following detailed description.

In accordance with one aspect of the present disclosure, a method for performing network-based positioning in a new radio-vehicle to everything (NR-V2X) communication system may include: determining whether positioning using a relay is required based on whether positioning performance of a user equipment (UE) is deteriorated; determining at least one relay UE to be used as an anchor node (AN) for positioning of the UE when the positioning using the relay is required; requesting UE-assisted measurement information for positioning of the UE from the relay UE; receiving the UE-assisted measurement information from the relay UE; and measuring an absolute position of the UE based on the UE-assisted measurement information, wherein the UE requiring its own positioning using the relay is classified as a remote UE, and the UE-assisted measurement information includes relay UE-assisted measurement information for performing positioning of the relay UE and remote UE-assisted measurement information for performing positioning of the remote UE.

The method may further include: requesting capability information from the relay UE; and receiving the capability information from the relay UE, wherein the capability information includes capability information of the relay UE and capability information of the remote UE.

The method may further include: determining a positioning method based on the capability information; and transmitting assistance data including the determined positioning method to the relay UE.

The positioning method may include a DL-TDoA-R positioning method, a multi-cell RTT-R positioning method, and a UL-TDoA-R positioning method.

The method may further include: determining the positioning method further based on the determined number of relay UEs.

The DL-TDoA-R positioning method may include: a first method of measuring an absolute position of the remote UE through UL-TDoA positioning between the relay UE and the remote UE; a second method of measuring an absolute position of the remote UE through a round trip time (RTT) between the relay UE and the remote UE; and a third method of measuring an absolute position of the remote UE using relative position information between the relay UE and the remote UE; wherein in the DL-TDoA-R positioning method, the absolute position of the relay UE is measured through DL-TDoA based on a Uu-Positioning Reference Signal (Uu-PRS) received through a Uu link.

The remote UE-assisted measurement information may be collected by the relay UE based on positioning signaling information and sidelink(SL)-PRS received from the remote UE through sidelink.

The positioning signaling information may be transmitted through any one of: first sidelink control information (SCI), second SCI, and/or a physical sidelink shared channel (PSSCH) of a physical sidelink control channel (PSCCH) in an NR-V2X service slot structure; and first SCI and/or second SCI of a PSCCH in a slot structure dedicated for NR-V2X sidelink positioning.

The positioning signaling information may include at least one of: a remote UE ID, a remote UE speed, a remote UE heading, a Time of Arrival (ToA) or Time of Flight (ToF) or relative position measured based on the SL-PRS received from the relay UE, a time at which the ToA, the ToF, or the relative position is measured, a quality level for the ToA, the ToF, or the relative position, and a reference signal received power (RSRP) for the SL-PRS received from the relay UE.

Among at least one candidate relay UE determined based on base station position information corresponding to the remote UE, a candidate relay UE in which a positioning quality indicator (PQI) of an absolute position measured at a network stage is equal to or greater than a predetermined threshold may be determined to be the anchor node (AN) for positioning of the remote UE.

In accordance with another aspect of the present disclosure, a server for performing network-based positioning may include: a transceiver configured to transmit and receive a signal to and from a base station (BS); a processor connected to the transceiver, wherein the processor is configured to: determine whether positioning using a relay is required based on whether positioning performance of a user equipment (UE) is deteriorated; determine at least one relay UE to be used as an anchor node (AN) for positioning of the UE when the positioning using the relay is required; request UE-assisted measurement information for positioning of the UE from the relay UE; and measure an absolute position of the UE based on the UE-assisted measurement information upon receiving the UE-assisted measurement information from the relay UE; wherein the UE requiring its own positioning using the relay is classified as a remote UE, and the UE-assisted measurement information includes relay UE-assisted measurement information for performing positioning of the relay UE and remote UE-assisted measurement information for performing positioning of the remote UE.

The processor may be configured to receive capability information from the relay UE after requesting the capability information from the relay UE, wherein the capability information includes capability information of the relay UE and capability information of the remote UE.

The processor may be configured to: determine a positioning method based on the capability information; and transmit assistance data including the determined positioning method to the relay UE.

The positioning method may include a DL-TDoA-R positioning method, a multi-cell RTT-R positioning method, and a UL-TDoA-R positioning method.

The positioning method may be determined further based on the determined number of relay UEs.

The DL-TDoA-R positioning method may include: a first method of measuring an absolute position of the remote UE through UL-TDoA positioning between the relay UE and the remote UE; a second method of measuring an absolute position of the remote UE through a round trip time (RTT) between the relay UE and the remote UE; and a third method of measuring an absolute position of the remote UE using relative position information between the relay UE and the remote UE; wherein, in the DL-TDoA-R positioning method, the absolute position of the relay UE is measured through DL-TDoA based on a Uu-Positioning Reference Signal (Uu-PRS) received through a Uu link.

The remote UE-assisted measurement information may be collected by the relay UE based on positioning signaling information and sidelink(SL)-PRS received from the remote UE through sidelink.

The positioning signaling information may be transmitted through any one of: first sidelink control information (SCI), second SCI, and/or a physical sidelink shared channel (PSSCH) of a physical sidelink control channel (PSCCH) in an NR-V2X service slot structure; and first SCI and/or second SCI of a PSCCH in a slot structure dedicated for NR-V2X sidelink positioning.

The positioning signaling information may include at least one of: a remote UE ID, a remote UE speed, a remote UE heading, a Time of Arrival (ToA) or Time of Flight (ToF) or relative position measured based on the SL-PRS received from the relay UE, a time at which the ToA, the ToF, or the relative position is measured, a quality level for the ToA, the ToF, or the relative position, and a reference signal received power (RSRP) for the SL-PRS received from the relay UE.

Among at least one candidate relay UE determined based on base station position information corresponding to the remote UE, a candidate relay UE in which a positioning quality indicator (PQI) of an absolute position measured at a network stage is equal to or greater than a predetermined threshold may be determined to be the anchor node (AN) for positioning of the remote UE.

In accordance with another aspect of the present disclosure, a processor configured to perform operations for a server in a new radio-vehicle to everything (NR-V2X) communication system may include: performing the operations, wherein the operations include: determining whether positioning using a relay is required based on whether positioning performance of a user equipment (UE) is deteriorated; determining at least one relay UE to be used as an anchor node (AN) for positioning of the UE when the positioning using the relay is required; requesting UE-assisted measurement information for positioning of the UE from the relay UE; receiving the UE-assisted measurement information from the relay UE; and measuring an absolute position of the UE based on the UE-assisted measurement information, wherein the UE requiring its own positioning using the relay is classified as a remote UE, and the UE-assisted measurement information includes relay UE-assisted measurement information for performing positioning of the relay UE and remote UE-assisted measurement information for performing positioning of the remote UE.

In accordance with another aspect of the present disclosure, a non-volatile computer-readable storage medium configured to store at least one computer program including instructions such that at least one processor performs operations for a server by executing the instructions, the non-volatile computer-readable storage medium may include: performing the operations, wherein the operations include: determining whether positioning using a relay is required based on whether positioning performance of a user equipment (UE) is deteriorated; determining at least one relay UE to be used as an anchor node (AN) for positioning of the UE when the positioning using the relay is required; requesting UE-assisted measurement information for positioning of the UE from the relay UE; receiving the UE-assisted measurement information from the relay UE; and measuring an absolute position of the UE based on the UE-assisted measurement information, wherein the UE requiring its own positioning using the relay is classified as a remote UE, and the UE-assisted measurement information includes relay UE-assisted measurement information for performing positioning of the relay UE and remote UE-assisted measurement information for performing positioning of the remote UE.

In accordance with another aspect of the present disclosure, a method for performing network-based positioning by a first user equipment (UE) in a new radio-vehicle to everything (NR-V2X) communication system may include: receiving a signal requesting UE-assisted measurement information from a network; generating the UE-assisted measurement information based on the received signal; and transmitting the generated UE-assisted measurement information to the network, wherein, when positioning using a relay is required based on whether positioning performance of a second user equipment (UE) serving as a remote UE is deteriorated, a signal requesting the UE-assisted measurement information is received from the network based on that the relay UE to be used as an anchor node (AN) for positioning of the remote UE is determined to be the first UE, and an absolute position of the remote UE is measured by the network based on the UE-assisted measurement information received from the relay UE, wherein the UE-assisted measurement information includes relay UE-assisted measurement information for performing positioning of the relay UE and remote UE-assisted measurement information for performing positioning of the remote UE.

In accordance with another aspect of the present disclosure, a first user equipment (UE) for performing network-based positioning may include: a transceiver configured to transmit and receive a signal to and from a base station (BS); a processor connected to the transceiver, wherein the processor is configured to: receive a signal requesting UE-assisted measurement information from a network, generate the UE-assisted measurement information based on the received signal, and transmit the generated UE-assisted measurement information to the network, wherein, when positioning using a relay is required based on whether positioning performance of a second user equipment (UE) serving as a remote UE is deteriorated, a signal requesting the UE-assisted measurement information is received from the network based on that the relay UE to be used as an anchor node (AN) for positioning of the remote UE is determined to be the first UE, and an absolute position of the remote UE is measured by the network based on the UE-assisted measurement information received from the relay UE, wherein the UE-assisted measurement information includes relay UE-assisted measurement information for performing positioning of the relay UE and remote UE-assisted measurement information for performing positioning of the remote UE.

The first UE may be configured to communicate with at least one of another UE, a UE related to an autonomous vehicle, a base station (BS), and a network.

In accordance with another aspect of the present disclosure, a processor configured to perform operations for a first user equipment (UE) in a new radio-vehicle to everything (NR-V2X) communication system may include: performing the operations, wherein the operations include: receiving a signal requesting UE-assisted measurement information from a network; generating the UE-assisted measurement information based on the received signal; and transmitting the generated UE-assisted measurement information to the network, wherein, when positioning using a relay is required based on whether positioning performance of a second user equipment (UE) serving as a remote UE is deteriorated, a signal requesting the UE-assisted measurement information is received from the network based on that the relay UE to be used as an anchor node (AN) for positioning of the remote UE is determined to be the first UE, and an absolute position of the remote UE is measured by the network based on the UE-assisted measurement information received from the relay UE, wherein the UE-assisted measurement information includes relay UE-assisted measurement information for performing positioning of the relay UE and remote UE-assisted measurement information for performing positioning of the remote UE.

In accordance with another aspect of the present disclosure, a non-volatile computer-readable storage medium configured to store at least one computer program including instructions such that at least one processor performs operations for a first user equipment (UE) by executing the instructions, the non-volatile computer-readable storage medium may include: performing the operations, wherein the operations include: receiving a signal requesting UE-assisted measurement information from a network; generating the UE-assisted measurement information based on the received signal; and transmitting the generated UE-assisted measurement information to the network.

When positioning using a relay is required based on whether positioning performance of a second user equipment (UE) serving as a remote UE is deteriorated, a signal requesting the UE-assisted measurement information is received from the network based on that the relay UE to be used as an anchor node (AN) for positioning of the remote UE is determined to be the first UE, and an absolute position of the remote UE is measured by the network based on the UE-assisted measurement information received from the relay UE, wherein the UE-assisted measurement information includes relay UE-assisted measurement information for performing positioning of the relay UE and remote UE-assisted measurement information for performing positioning of the remote UE.

The network-based positioning method using a relay according to various embodiments of the present disclosure has an advantage in that positioning performance can be improved by performing positioning on a remote UE having deteriorated positioning performance through network cooperation with a relay UE.

The network-based positioning method using a relay according to various embodiments of the present disclosure can adaptively provide various positioning methods based on a positioning service type, positioning capabilities of a UE and a relay, the number of available anchor nodes (ANs), change in the surrounding environment, etc., thereby providing a positioning solution optimized for the UE and network situations.

In addition, the network-based positioning method using a relay according to various embodiments of the present disclosure can effectively improve positioning performance of a remote UE having deteriorated positioning performance through cooperation with the relay UE without additional network expansion.

In addition, the present disclosure provides a new positioning protocol using a relay UE, thereby effectively performing network-based positioning for a remote UE incapable of receiving a Uu-PRS from a base station (BS).

In addition, the procedure for performing the network-based positioning protocol for DL-TDoA-R positioning according to the present disclosure can be easily applied to the procedure for positioning protocol (PP) processing for "Multi-cell RTT positioning with Relay" and "UL-TDoA positioning with Relay".

Effects to be achieved by embodiment(s) are not limited to what has been particularly described hereinabove and other effects not mentioned herein will be more clearly understood by persons skilled in the art to which embodiment(s) pertain from the following detailed description.

BRIEF DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 6 illustrates a radio protocol architecture for SL communication.

FIG. 7 illustrates UEs performing V2X or SL communication.

FIG. 10 is a diagram illustrating an example of an architecture in a 5G system, that can perform positioning of a UE connected to a Next Generation-Radio Access Network (NG-RAN) or E-UTRAN according to an example of the present disclosure.

FIG. 16 is a flowchart illustrating a procedure for performing network-based positioning using a relay UE according to an embodiment of the present disclosure.

DETAILED DESCRIPTION

Figure 1:
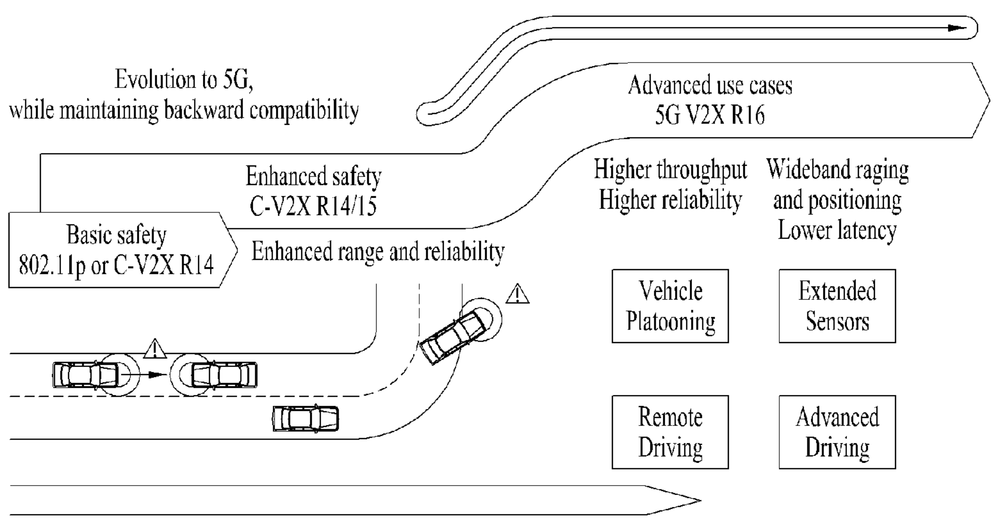
FIG. 1 is a diagram for explaining by comparing V2X communication based on RAT before NR and V2X communication based on NR.

In accordance with one aspect of the present disclosure, a method for performing network-based positioning in a new radio-vehicle to everything (NR-V2X) communication system may include: determining whether positioning using a relay is required based on whether positioning performance of a user equipment (UE) is deteriorated; determining at least one relay UE to be used as an anchor node (AN) for positioning of the UE when the positioning using the relay is required; requesting UE-assisted measurement information for positioning of the UE from the relay UE; receiving the UE-assisted measurement information from the relay UE; and measuring an absolute position of the UE based on the UE-assisted measurement information. The UE requiring its own positioning using the relay is classified as a remote UE, and the UE-assisted measurement information includes relay UE-assisted measurement information for performing positioning of the relay UE and remote UE-assisted measurement information for performing positioning of the remote UE.

MODE FOR INVENTION

The wireless communication system is a multiple access system that supports communication with multiple users by sharing available system resources (e.g., bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, a single carrier frequency (SC-FDMA) system, a multi carrier frequency division multiple access (MC-FDMA) system, and the like.

A sidelink refers to a communication scheme in which a direct link is established between user equipments (UEs) to directly exchange voice or data between UEs without assistance from a base station (BS). The sidelink is being considered as one way to address the burden on the BS caused by rapidly increasing data traffic.

Vehicle-to-everything (V2X) refers to a communication technology for exchanging information with other vehicles, pedestrians, and infrastructure-built objects through wired/wireless communication. V2X may be divided into four types: vehicle-to-vehicle (V2V), vehicle-to-infrastructure (V2I), vehicle-to-network (V2N), and vehicle-to-pedestrian (V2P). V2X communication may be provided through a PC5 interface and/or a Uu interface.

As more and more communication devices require larger communication capacities in transmitting and receiving signals, there is a need for mobile broadband communication improved from the legacy radio access technology. Accordingly, communication systems considering services/UEs sensitive to reliability and latency are under discussion. A next-generation radio access technology in consideration of enhanced mobile broadband communication, massive MTC, and Ultra-Reliable and Low Latency Communication (URLLC) may be referred to as new radio access technology (RAT) or new radio (NR). Even in NR, V2X communication may be supported.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. 3GPP NR (New Radio or New Radio Access Technology) is an evolved version of 3GPP LTE/LTE-A/LTE-A pro.

5G NR is a successor technology of LTE-A, and is a new clean-slate mobile communication system with characteristics such as high performance, low latency, and high availability. 5G NR may utilize all available spectrum resources, from low frequency bands below 1 GHz to intermediate frequency bands from 1 GHz to 10 GHz and high frequency (millimeter wave) bands above 24 GHz.

For clarity of explanation, LTE-A or 5G NR is mainly described, but the technical spirit of the embodiment(s) is not limited thereto.

Figure 2:
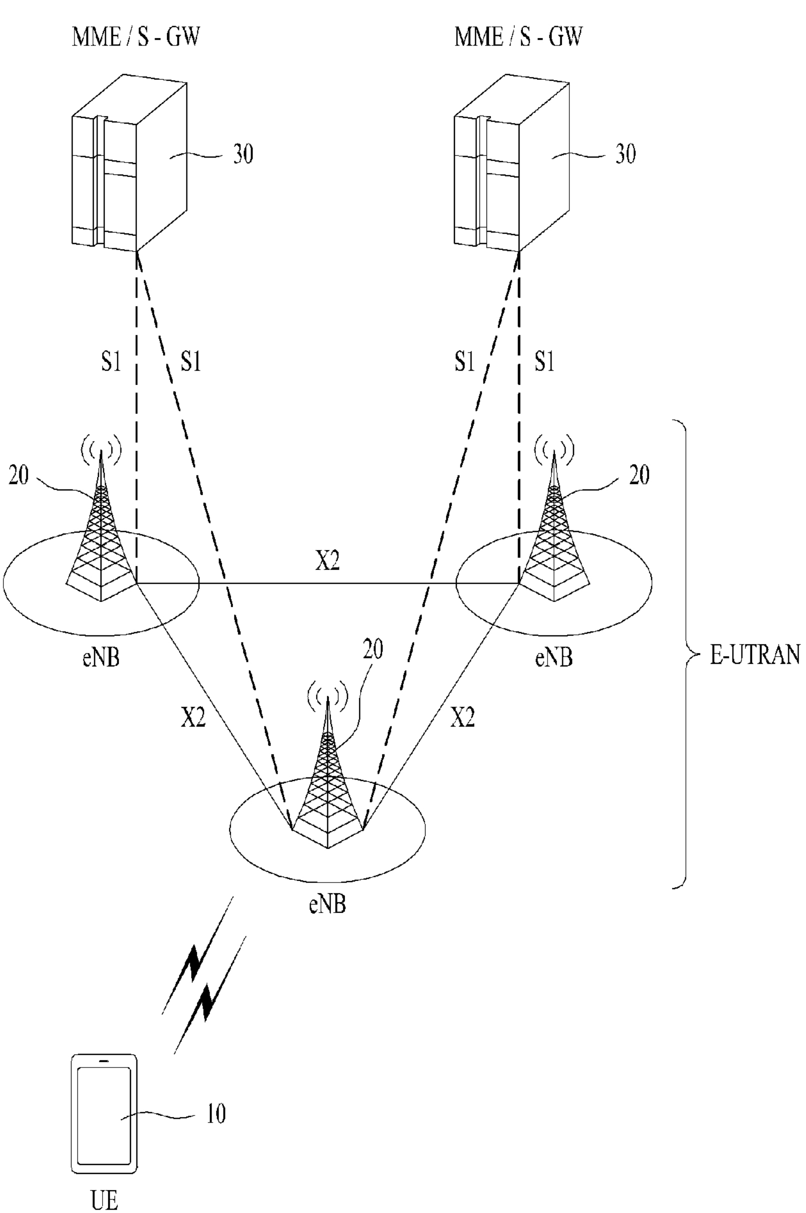
FIG. 2 illustrates the structure of an LTE system to which embodiment(s) are applicable.

FIG. 2 illustrates the structure of an LTE system to which the present disclosure is applicable. This may also be called an evolved UMTS terrestrial radio access network (E-UTRAN) or LTE/LTE-A system.

Referring to FIG. 2, the E-UTRAN includes evolved Node Bs (eNBs) 20 which provide a control plane and a user plane to UEs 10. A UE 10 may be fixed or mobile, and may also be referred to as a mobile station (MS), user UE (UT), subscriber station (SS), mobile UE (MT), or wireless device. An eNB 20 is a fixed station communication with the UE 10 and may also be referred to as a base station (BS), a base transceiver system (BTS), or an access point.

eNBs 20 may be connected to each other via an X2 interface. An eNB 20 is connected to an evolved packet core (EPC) 39 via an S1 interface. More specifically, the eNB 20 is connected to a mobility management entity (MME) via an S1-MME interface and to a serving gateway (S-GW) via an S1-U interface.

The EPC 30 includes an MME, an S-GW, and a packet data network-gateway (P-GW). The MME has access information or capability information about UEs, which are mainly used for mobility management of the UEs. The S-GW is a gateway having the E-UTRAN as an end point, and the P-GW is a gateway having a packet data network (PDN) as an end point.

Based on the lowest three layers of the open system interconnection (OSI) reference model known in communication systems, the radio protocol stack between a UE and a network may be divided into Layer 1 (L1), Layer 2 (L2) and Layer 3 (L3). These layers are defined in pairs between a UE and an Evolved UTRAN (E-UTRAN), for data transmission via the Uu interface. The physical (PHY) layer at L1 provides an information transfer service on physical channels. The radio resource control (RRC) layer at L3 functions to control radio resources between the UE and the network. For this purpose, the RRC layer exchanges RRC messages between the UE and an eNB.

Figure 3:
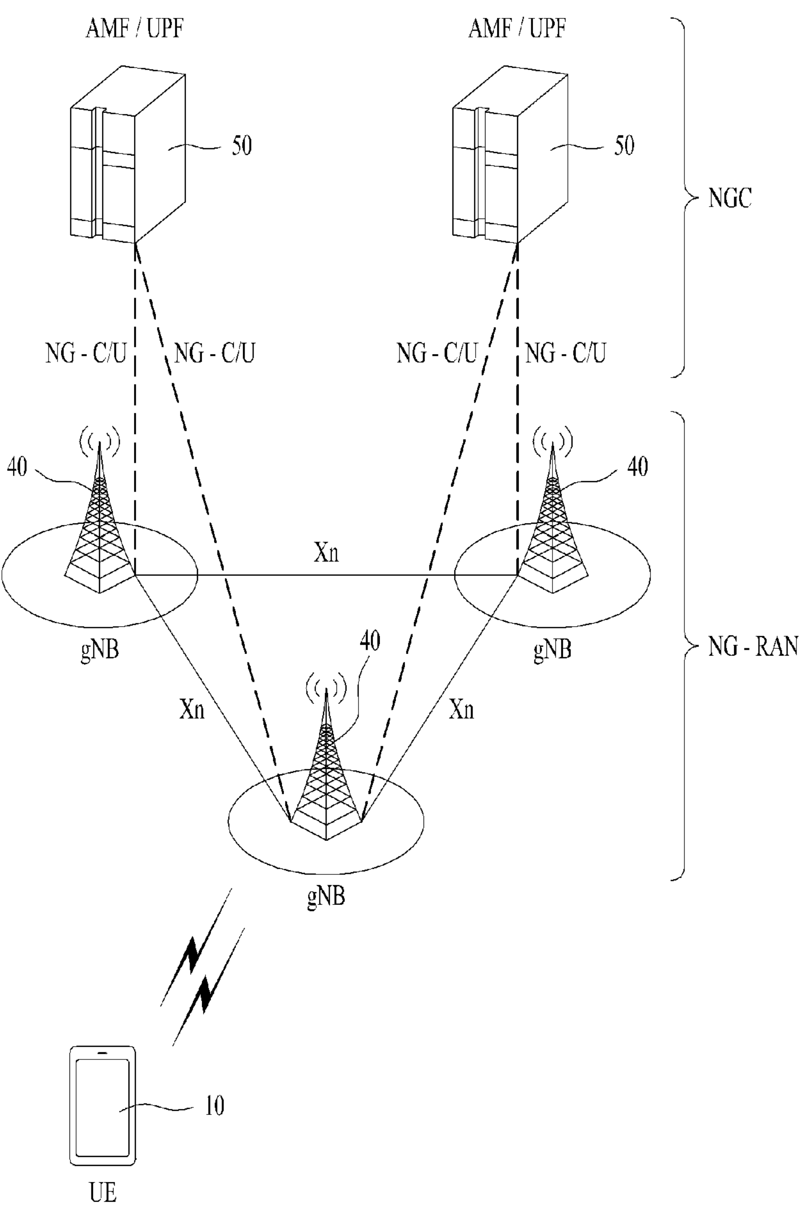
FIG. 3 illustrates the structure of an NR system to which embodiment(s) are applicable.

FIG. 3 illustrates the structure of a NR system to which the present disclosure is applicable.

Referring to FIG. 3, a next generation radio access network (NG-RAN) may include a next generation Node B (gNB) and/or an eNB, which provides user-plane and control-plane protocol termination to a UE. In FIG. 3, the NG-RAN is shown as including only gNBs, by way of example. A gNB and an eNB are connected to each other via an Xn interface. The gNB and the eNB are connected to a 5G core network (5GC) via an NG interface. More specifically, the gNB and the eNB are connected to an access and mobility management function (AMF) via an NG-C interface and to a user plane function (UPF) via an NG-U interface.

The gNB and/or eNB may provide functions such as inter-cell radio resource management (RRM), radio bearer (RB) management, connection mobility control, radio admission control, Measurement configuration & Provision, and dynamic resource allocation. AMF can provide functions such as NAS security and idle state mobility handling. UPF may provide functions such as mobility anchoring and PDU processing. Session Management Function (SMF) may provide functions such as terminal IP address allocation and PDU session control.

Figure 4:
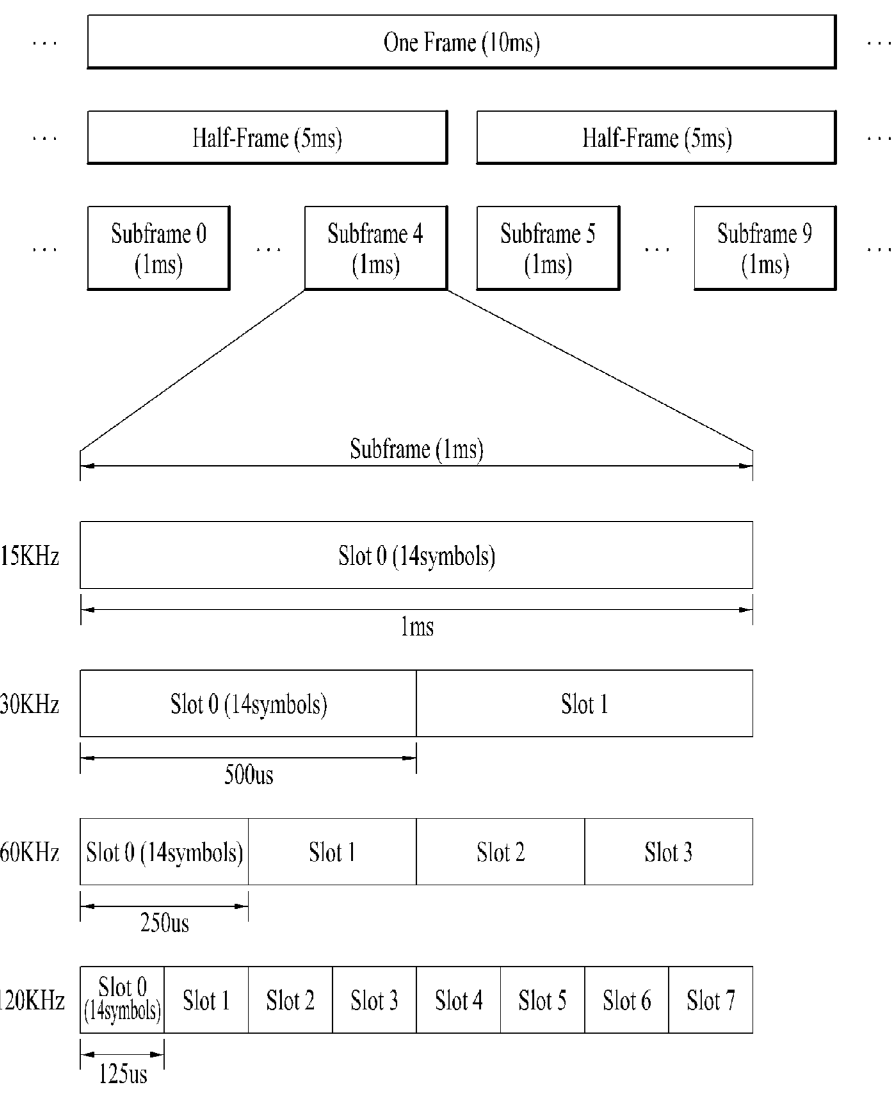
FIG. 4 illustrates the structure of an NR radio frame to which embodiment(s) are applicable.

FIG. 4 illustrates the structure of a NR radio frame to which the present disclosure is applicable.

Referring to FIG. 4, a radio frame may be used for UL transmission and DL transmission in NR. A radio frame is 10 ms in length, and may be defined by two 5-ms half-frames. An HF may include five 1-ms subframes. A subframe may be divided into one or more slots, and the number of slots in an SF may be determined according to a subcarrier spacing (SCS). Each slot may include 12 or 14 OFDM(A) symbols according to a cyclic prefix (CP).

In a normal CP (NCP) case, each slot may include 14 symbols, whereas in an extended CP (ECP) case, each slot may include 12 symbols. Herein, a symbol may be an OFDM symbol (or CP-OFDM symbol) or an SC-FDMA symbol (or DFT-s-OFDM symbol).

Table 1 below lists the number of symbols per slot $N^{slot}_{symb}$, the number of slots per frame $N^{frame,\mu}_{slot}$, and the number of slots per subframe $N^{subframe,\mu}_{slot}$ according to an SCS configuration μ in the NCP case.

TABLE 1

| SCS (15*2u) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 below lists the number of symbols per slot, the number of slots per frame, and the number of slots per subframe according to an SCS in the ECP case.

TABLE 2

| SCS (15*2^u) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In the NR system, different OFDM(A) numerologies (e.g., SCSs, CP lengths, etc.) may be configured for a plurality of cells aggregated for one UE. Thus, the (absolute) duration of a time resource (e.g., SF, slot, or TTI) including the same number of symbols may differ between the aggregated cells (such a time resource is commonly referred to as a time unit (TU) for convenience of description). In NR, multiple numerologies or SCSs to support various 5G services may be supported. For example, a wide area in conventional cellular bands may be supported when the SCS is 15 kHz, and a dense urban environment, lower latency, and a wider carrier bandwidth may be supported when the SCS is 30 kHz/60 kHz. When the SCS is 60 kHz or higher, a bandwidth wider than 24.25 GHz may be supported to overcome phase noise.

The NR frequency band may be defined as two types of frequency ranges. The two types of frequency ranges may be FR1 and FR2. The numerical values of the frequency ranges may be changed. For example, the two types of frequency ranges may be configured as shown in Table 3 below. Among the frequency ranges used in the NR system, FR1 may represent "sub 6 GHz range" and FR2 may represent "above 6 GHz range" and may be called millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical values of the frequency ranges of the NR system may be changed. For example, FR1 may include a band of 410 MHz to 7125 MHz as shown in Table 4 below. That is, FR1 may include a frequency band of 6 GHz (or 5850 MHz, 5900 MHz, 5925 MHz, etc.) or higher. For example, the frequency band of 6 GHz (or 5850 MHz, 5900 MHz, 5925 MHz, etc.) or higher included in FR1 may include an unlicensed band. The unlicensed band may be used for various purposes, for example, for communication for vehicles (e.g., autonomous driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 5:
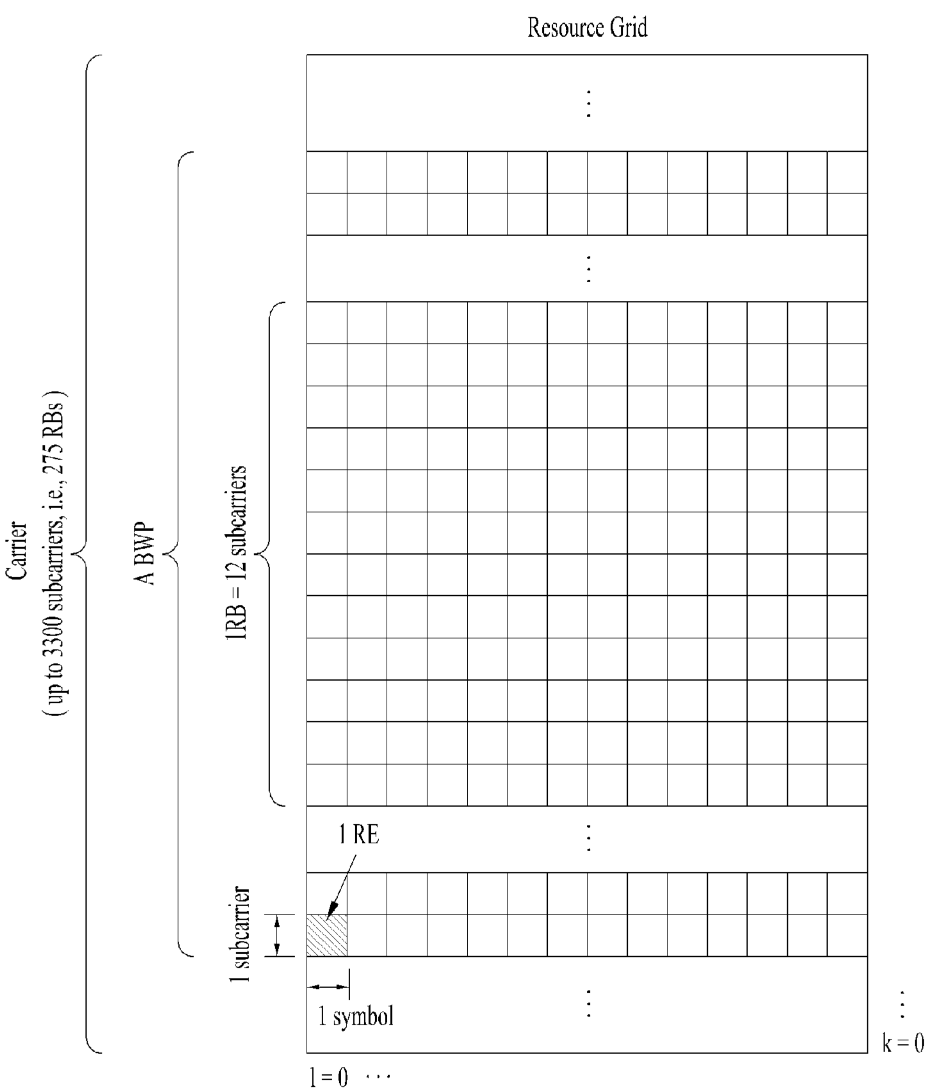
FIG. 5 illustrates the slot structure of an NR frame to which embodiment(s) are applicable.

FIG. 5 illustrates the slot structure of a NR frame to which the present disclosure is applicable.

Referring to FIG. 5, one slot includes a plurality of symbols in the time domain. For example, one slot may include 14 symbols in a normal CP and 12 symbols in an extended CP. Alternatively, one slot may include 7 symbols in the normal CP and 6 symbols in the extended CP.

A carrier may include a plurality of subcarriers in the frequency domain. A resource block (RB) is defined as a plurality of consecutive subcarriers (e.g., 12 subcarriers) in the frequency domain. A bandwidth part (BWP) may be defined as a plurality of consecutive (P)RBs in the frequency domain, and the BWP may correspond to one numerology (e.g., SCS, CP length, etc.). The carrier may include up to N (e.g., 5) BWPs. Data communication may be conducted in an activated BWP. In a resource grid, each element may be referred to as a resource element (RE) and may be mapped to one complex symbol.

The wireless interface between UEs or the wireless interface between a UE and a network may be composed of an L1 layer, an L2 layer, and an L3 layer. In various embodiments of the present disclosure, the L1 layer may represent a physical layer. The L2 layer may represent, for example, at least one of a MAC layer, an RLC layer, a PDCP layer, and an SDAP layer. The L3 layer may represent, for example, an RRC layer.

Hereinafter, V2X or sidelink (SL) communication will be described.

FIG. 6 illustrates a radio protocol architecture for SL communication. Specifically, FIG. 6-(*a*) shows a user plane protocol stack of NR, and FIG. 6-(*b*) shows a control plane protocol stack of NR.

Hereinafter, a sidelink synchronization signal (SLSS) and synchronization information will be described.

The SLSS is an SL-specific sequence, and may include a primary sidelink synchronization signal (PSSS) and a secondary sidelink synchronization signal (SSSS). The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, the UE may detect an initial signal and acquire synchronization using the S-PSS. For example, the UE may acquire detailed synchronization using the S-PSS and the S-SSS, and may detect a synchronization signal ID.

Aphysical sidelink broadcast channel (PSBCH) may be a (broadcast) channel on which basic (system) information that the UE needs to know first before transmission and reception of an SL signal is transmitted. For example, the basic information may include SLSS related information, a duplex mode (DM), time division duplex uplink/downlink (TDD UL/DL) configuration, resource pool related information, the type of an application related to the SLSS, a subframe offset, and broadcast information. For example, for evaluation of PSBCH performance, the payload size of PSBCH in NR V2X may be 56 bits including CRC of 24 bits.

The S-PSS, S-SSS, and PSBCH may be included in a block format (e.g., an SL synchronization signal (SS)/PSBCH block, hereinafter sidelink-synchronization signal block (S-SSB)) supporting periodic transmission. The S-SSB may have the same numerology (i.e., SCS and CP length) as a physical sidelink control channel (PSCCH)/physical sidelink shared channel (PSSCH) in the carrier, and the transmission bandwidth thereof may be within a (pre)set sidelink BWP (SL BWP). For example, the bandwidth of the S-SSB may be 11 resource blocks (RBs). For example, the PSBCH may span 11 RBs. The frequency position of the S-SSB may be (pre)set. Accordingly, the UE does not need to perform hypothesis detection at a frequency to discover the S-SSB in the carrier.

In the NR SL system, a plurality of numerologies having different SCSs and/or CP lengths may be supported. In this case, as the SCS increases, the length of the time resource in which the transmitting UE transmits the S-SSB may be shortened. Thereby, the coverage of the S-SSB may be narrowed. Accordingly, in order to guarantee the coverage of the S-SSB, the transmitting UE may transmit one or more S-SSBs to the receiving UE within one S-SSB transmission period according to the SCS. For example, the number of S-SSBs that the transmitting UE transmits to the receiving UE within one S-SSB transmission period may be pre-configured or configured for the transmitting UE. For example, the S-SSB transmission period may be 160 ms. For example, for all SCSs, the S-SSB transmission period of 160 ms may be supported.

For example, when the SCS is 15 kHz in FR1, the transmitting UE may transmit one or two S-SSBs to the receiving UE within one S-SSB transmission period. For example, when the SCS is 30 kHz in FR1, the transmitting UE may transmit one or two S-SSBs to the receiving UE within one S-SSB transmission period. For example, when the SCS is 60 kHz in FR1, the transmitting UE may transmit one, two, or four S-SSBs to the receiving UE within one S-SSB transmission period.

For example, when the SCS is 60 kHz in FR2, the transmitting UE may transmit 1, 2, 4, 8, 16 or 32 S-SSBs to the receiving UE within one S-SSB transmission period. For example, when SCS is 120 kHz in FR2, the transmitting UE may transmit 1, 2, 4, 8, 16, 32 or 64 S-SSBs to the receiving UE within one S-SSB transmission period.

When the SCS is 60 kHz, two types of CPs may be supported. In addition, the structure of the S-SSB transmitted from the transmitting UE to the receiving UE may depend on the CP type. For example, the CP type may be normal CP (NCP) or extended CP (ECP). Specifically, for example, when the CP type is NCP, the number of symbols to which the PSBCH is mapped in the S-SSB transmitted by the transmitting UE may be 9 or 8. On the other hand, for example, when the CP type is ECP, the number of symbols to which the PSBCH is mapped in the S-SSB transmitted by the transmitting UE may be 7 or 6. For example, the PSBCH may be mapped to the first symbol in the S-SSB transmitted by the transmitting UE. For example, upon receiving the S-SSB, the receiving UE may perform an automatic gain control (AGC) operation in the period of the first symbol for the S-SSB.

FIG. 7 illustrates UEs performing V2X or SL communication.

Referring to FIG. 7, in V2X or SL communication, the term UE may mainly refer to a user's UE. However, when network equipment such as a BS transmits and receives signals according to a communication scheme between UEs, the BS may also be regarded as a kind of UE. For example, UE 1 may be the first device 100, and UE 2 may be the second device 200.

For example, UE 1 may select a resource unit corresponding to a specific resource in a resource pool, which represents a set of resources. Then, UE 1 may transmit an SL signal through the resource unit. For example, UE 2, which is a receiving UE, may receive a configuration of a resource pool in which UE 1 may transmit a signal, and may detect a signal of UE 1 in the resource pool.

Here, when UE 1 is within the connection range of the BS, the BS may inform UE 1 of a resource pool. On the other hand, when the UE 1 is outside the connection range of the BS, another UE may inform UE 1 of the resource pool, or UE 1 may use a preconfigured resource pool.

In general, the resource pool may be composed of a plurality of resource units, and each UE may select one or multiple resource units and transmit an SL signal through the selected units.

Figure 8:
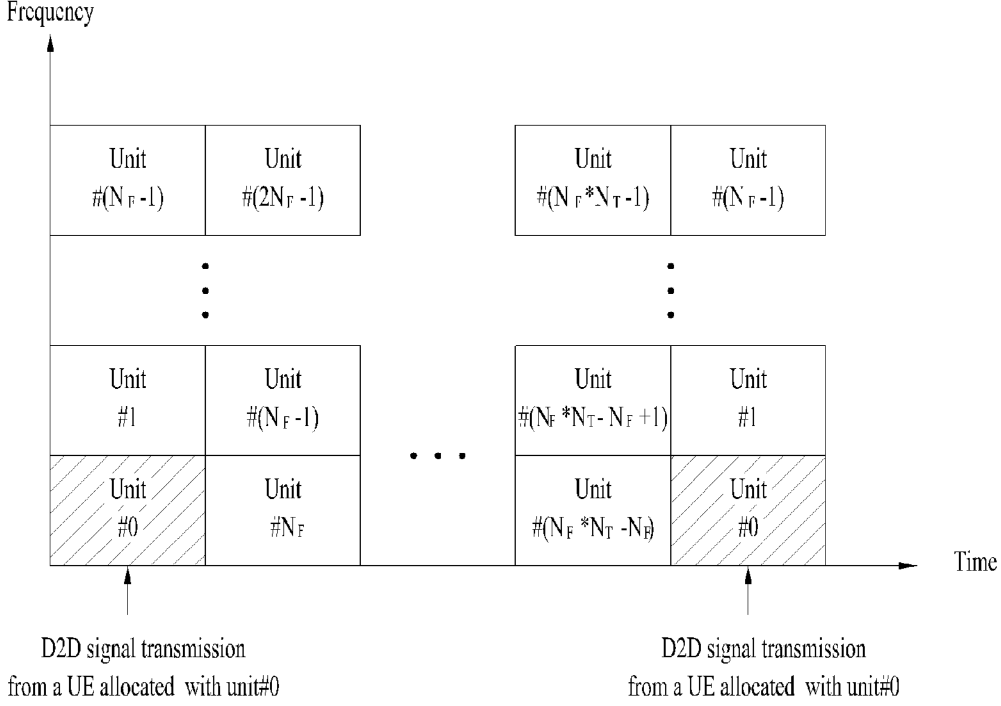
FIG. 8 illustrates resource units for V2X or SL communication.

FIG. 8 illustrates resource units for V2X or SL communication.

Referring to FIG. 8, the frequency resources of a resource pool may be divided into NF sets, and the time resources of the resource pool may be divided into NT sets. Accordingly, a total of NF*NT resource units may be defined in the resource pool. FIG. 8 shows an exemplary case where the resource pool is repeated with a periodicity of NT subframes.

As shown in FIG. 8, one resource unit (e.g., Unit #0) may appear periodically and repeatedly. Alternatively, in order to obtain a diversity effect in the time or frequency dimension, an index of a physical resource unit to which one logical resource unit is mapped may change in a predetermined pattern over time. In this structure of resource units, the resource pool may represent a set of resource units available to a UE which intends to transmit an SL signal.

Resource pools may be subdivided into several types. For example, according to the content in the SL signal transmitted in each resource pool, the resource pools may be divided as follows.

(1) Scheduling assignment (SA) may be a signal including information such as a position of a resource through which a transmitting UE transmits an SL data channel, a modulation and coding scheme (MCS) or multiple input multiple output (MIMO) transmission scheme required for demodulation of other data channels, and timing advance (TA). The SA may be multiplexed with SL data and transmitted through the same resource unit. In this case, an SA resource pool may represent a resource pool in which SA is multiplexed with SL data and transmitted. The SA may be referred to as an SL control channel.

(2) SL data channel (physical sidelink shared channel (PSSCH)) may be a resource pool through which the transmitting UE transmits user data. When the SA and SL data are multiplexed and transmitted together in the same resource unit, only the SL data channel except for the SA information may be transmitted in the resource pool for the SL data channel. In other words, resource elements (REs) used to transmit the SA information in individual resource units in the SA resource pool may still be used to transmit the SL data in the resource pool of the SL data channel. For example, the transmitting UE may map the PSSCH to consecutive PRBs and transmit the same.

(3) The discovery channel may be a resource pool used for the transmitting UE to transmit information such as the ID thereof. Through this channel, the transmitting UE may allow a neighboring UE to discover the transmitting UE.

Even when the SL signals described above have the same content, they may use different resource pools according to the transmission/reception properties of the SL signals. For example, even when the SL data channel or discovery message is the same among the signals, it may be classified into different resource pools according to determination of the SL signal transmission timing (e.g., transmission at the reception time of the synchronization reference signal or transmission by applying a predetermined TA at the reception time), a resource allocation scheme (e.g., the BS designates individual signal transmission resources to individual transmitting UEs or individual transmission UEs select individual signal transmission resources within the resource pool), signal format (e.g., the number of symbols occupied by each SL signal in a subframe, or the number of subframes used for transmission of one SL signal), signal strength from a BS, the strength of transmit power of an SL UE, and the like.

Hereinafter, resource allocation in the SL will be described.

Figure 9:
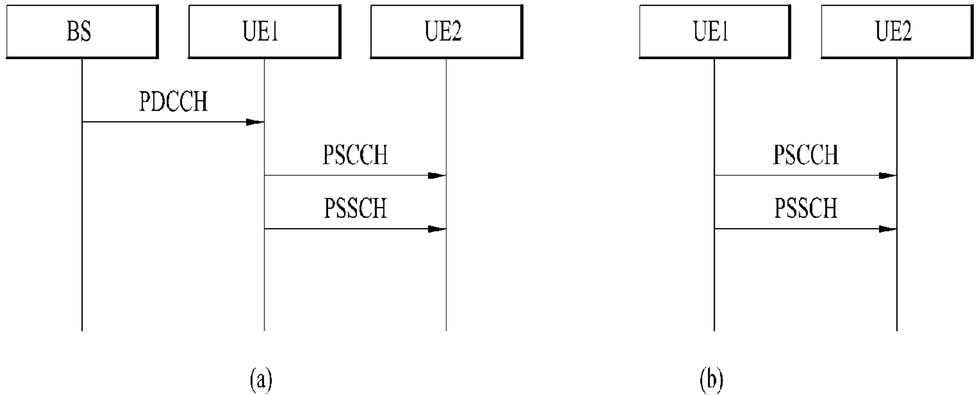
FIG. 9 illustrates a procedure in which UEs perform V2X or SL communication according to a transmission mode.

FIG. 9 illustrates a procedure in which UEs perform V2X or SL communication according to a transmission mode. In various embodiments of the present disclosure, the transmission mode may be referred to as a mode or a resource allocation mode. Hereinafter, for simplicity, the transmission mode in LTE may be referred to as an LTE transmission mode, and the transmission mode in NR may be referred to as an NR resource allocation mode.

For example, FIG. 9-(*a*) illustrates a UE operation related to LTE transmission mode 1 or LTE transmission mode 3. Alternatively, for example, FIG. 9-(*a*) illustrates a UE operation related to NR resource allocation mode 1. For example, LTE transmission mode 1 may be applied to general SL communication, and LTE transmission mode 3 may be applied to V2X communication.

For example, FIG. 9-(*b*) illustrates a UE operation related to LTE transmission mode 2 or LTE transmission mode 4. Alternatively, for example, FIG. 9-(*b*) illustrates a UE operation related to NR resource allocation mode 2.

Referring to FIG. 9-(*a*), in LTE transmission mode 1, LTE transmission mode 3 or NR resource allocation mode 1, the BS may schedule an SL resource to be used by the UE for SL transmission. For example, the BS may perform resource scheduling for UE 1 through PDCCH (more specifically, downlink control information (DCI)), and UE 1 may perform V2X or SL communication with UE 2 according to the resource scheduling. For example, UE 1 may transmit sidelink control information (SCI) to UE 2 on a physical sidelink control channel (PSCCH), and then transmit data which is based on the SCI to UE 2 on a physical sidelink shared channel (PSSCH).

For example, in NR resource allocation mode 1, the UE may be provided with or allocated resources for one or more SL transmissions of a transport block (TB) from the BS through a dynamic grant. For example, the BS may provide a resource for transmission of the PSCCH and/or PSSCH to the UE using the dynamic grant. For example, the transmitting UE may report the SL hybrid automatic repeat request (HARQ) feedback received from the receiving UE to the BS. In this case, the PUCCH resource and timing for reporting the SL HARQ feedback to the BS may be determined based on an indication in the PDCCH through the BS is to allocate a resource for SL transmission.

For example, DCI may include a slot offset between DCI reception and the first SL transmission scheduled by the DCI. For example, the minimum gap between the DCI scheduling a SL transmission resource and the first scheduled SL transmission resource may not be shorter than the processing time of the corresponding UE.

For example, in NR resource allocation mode 1, the UE may be periodically provided with or allocated a resource set from the BS for a plurality of SL transmissions through a configured grant. For example, the configured grant may include configured grant type 1 or configured grant type 2. For example, the UE may determine a TB to be transmitted in each occasion indicated by a given configured grant.

For example, the BS may allocate SL resources to the UE on the same carrier, and may allocate SL resources to the UE on different carriers.

For example, an NR BS may control LTE-based SL communication. For example, the NR BS may transmit NR DCI to the UE to schedule an LTE SL resource. In this case, for example, a new RNTI for scrambling the NR DCI may be defined. For example, the UE may include an NR SL module and an LTE SL module.

For example, after the UE including the NR SL module and the LTE SL module receives NR SL DCI from the gNB, the NR SL module may transform the NR SL DCI to LTE DCI type 5A, and the NR SL module may deliver LTE DCI type 5A to the LTE SL module in units of X ms. For example, the LTE SL module may apply activation and/or release to the first LTE subframe Z ms after the LTE SL module receives LTE DCI format 5A from the NR SL module. For example, the X may be dynamically indicated using a field of DCI. For example, the minimum value of X may depend on the UE capability. For example, the UE may report a single value according to the UE capability. For example, X may be a positive number.

Referring to FIG. 9(*b*), in LTE transmission mode 2, LTE transmission mode 4, or NR resource allocation mode 2, the UE may determine AN SL resource within the SL resources configured by the BS/network or the preconfigured SL resources. For example, the configured SL resources or the preconfigured SL resources may be a resource pool. For example, the UE may autonomously select or schedule a resource for SL transmission. For example, the UE may autonomously select a resource within the configured resource pool to perform SL communication. For example, the UE may select a resource within a selection window by performing a sensing and resource (re)selection procedure. For example, the sensing may be performed on a per sub-channel basis. In addition, UE 1, which has selected a resource within the resource pool, may transmit SCI to UE 2 through the PSCCH, and then transmit data, which is based on the SCI, to UE 2 through the PSSCH.

For example, a UE may assist in selecting an SL resource for another UE. For example, in NR resource allocation mode 2, the UE may receive a configured grant for SL transmission. For example, in NR resource allocation mode 2, the UE may schedule SL transmission of another UE. For example, in NR resource allocation mode 2, the UE may reserve an SL resource for blind retransmission.

For example, in NR resource allocation mode 2, UE 1 may indicate the priority of SL transmission to UE 2 using the SCI. For example, UE 2 may decode the SCI. UE 2 may perform sensing and/or resource (re)selection based on the priority. For example, the resource (re)selection procedure may include an operation of identifying candidate resources in a resource selection window by UE 2, and an operation of selecting, by UE 2, a resource for (re)transmission from among the identified candidate resources. For example, the resource selection window may be a time interval during which the UE selects the resource for SL transmission. For example, after UE 2 triggers resource (re)selection, the resource selection window may start at T1≥0. The resource selection window may be limited by the remaining packet delay budget of UE 2. For example, in the operation of identifying the candidate resources in the resource selection window by UE 2, a specific resource may be indicated by the SCI received by UE 2 from UE 1. When the L1 SL RSRP measurement value for the specific resource exceeds an SL RSRP threshold, UE 2 may not determine the specific resource as a candidate resource. For example, the SL RSRP threshold may be determined based on the priority of the SL transmission indicated by the SCI received by UE 2 from UE 1 and the priority of the SL transmission on the resource selected by UE 2.

For example, the L1 SL RSRP may be measured based on an SL demodulation reference signal (DMRS). For example, one or more PSSCH DMRS patterns may be configured or preconfigured for each resource pool in the time domain. For example, PDSCH DMRS configuration type 1 and/or type 2 may be the same as or similar to the frequency domain pattern of the PSSCH DMRS. For example, the exact DMRS pattern may be indicated by the SCI. For example, in NR resource allocation mode 2, the transmitting UE may select a specific DMRS pattern from among DMRS patterns configured or preconfigured for the resource pool.

For example, in NR resource allocation mode 2, based on the sensing and resource (re)selection procedure, the transmitting UE may perform initial transmission of a TB without reservation. For example, based on the sensing and resource (re)selection procedure, using the SCI associated with a first TB, the transmitting UE may reserve the SL resource for initial transmission of a second TB.

For example, in NR resource allocation mode 2, the UE may reserve a resource for feedback-based PSSCH retransmission through signaling related to previous transmission of the same TB. For example, the maximum number of SL resources reserved by one transmission including the current transmission may be 2, 3, or 4. For example, the maximum number of SL resources may be the same regardless of whether HARQ feedback is enabled. For example, the maximum number of HARQ (re)transmissions for one TB may be limited by configuration or pre-configuration. For example, the maximum number of HARQ (re)transmissions may be up to 32. For example, when the configuration or pre-configuration is not present, the maximum number of HARQ (re)transmissions may be unspecified. For example, the configuration or pre-configuration may be for the transmitting UE. For example, in NR resource allocation mode 2, HARQ feedback for releasing resources not used by the UE may be supported.

For example, in NR resource allocation mode 2, the UE may indicate to another UE one or more sub-channels and/or slots used by the UE, using the SCI. For example, the UE may indicate to another UE one or more sub-channels and/or slots reserved by the UE for PSSCH (re)transmission, using SCI. For example, the minimum allocation unit of the SL resource may be a slot. For example, the size of the sub-channel may be configured for the UE or may be preconfigured.

Hereinafter, sidelink control information (SCI) will be described.

Control information transmitted by the BS to the UE on the PDCCH may be referred to as downlink control information (DCI), whereas control information transmitted by the UE to another UE on the PSCCH may be referred to as SCI. For example, before decoding the PSCCH, the UE may be aware of the start symbol of the PSCCH and/or the number of symbols of the PSCCH. For example, the SCI may include SL scheduling information. For example, the UE may transmit at least one SCI to another UE to schedule the PSSCH. For example, one or more SCI formats may be defined.

For example, the transmitting UE may transmit the SCI to the receiving UE on the PSCCH. The receiving UE may decode one SCI to receive the PSSCH from the transmitting UE.

For example, the transmitting UE may transmit two consecutive SCIs (e.g., 2-stage SCI) to the receiving UE on the PSCCH and/or the PSSCH. The receiving UE may decode the two consecutive SCIs (e.g., 2-stage SCI) to receive the PSSCH from the transmitting UE. For example, when the SCI configuration fields are divided into two groups in consideration of the (relatively) high SCI payload size, the SCI including a first SCI configuration field group may be referred to as first SCI or 1st SCI, and the SCI including a second SCI configuration field group may be referred to as second SCI or 2nd SC. For example, the transmitting UE may transmit the first SCI to the receiving UE on the PSCCH. For example, the transmitting UE may transmit the second SCI to the receiving UE on the PSCCH and/or the PSSCH. For example, the second SCI may be transmitted to the receiving UE on the (independent) PSCCH, or may be piggybacked together with data and transmitted on the PSSCH. For example, the two consecutive SCIs may be applied for different transmissions (e.g., unicast, broadcast, or groupcast).

For example, the transmitting UE may transmit some or all of the following information to the receiving UE through SCI. Here, for example, the transmitting UE may transmit some or all of the following information to the receiving UE through the first SCI and/or the second SCI:

- PSSCH and/or PSCCH related resource allocation information, for example, the positions/number of time/frequency resources, resource reservation information (e.g., periodicity); and/or
- SL CSI report request indicator or SL (L1) RSRP (and/or SL (L1) RSRQ and/or SL (L1) RSSI) report request indicator; and/or
- SL CSI transmission indicator (or SL (L1) RSRP (and/or SL (L1) RSRQ and/or SL (L1) RSSI) information transmission indicator) (on PSSCH); and/or
- MCS information; and/or
- transmit power information; and/or
- L1 destination ID information and/or L1 source ID information; and/or
- SL HARQ process ID information; and/or
- new data indicator (NDI) information; and/or
- redundancy version (RV) information; and/or
- (transmission traffic/packetrelated) QoS information; e.g., priority information; and/or
- SL CSI-RS transmission indicator or information on the number of (transmitted) SL CSI-RS antenna ports;
- Location information about the transmitting UE or location (or distance/area) information about a target receiving UE (to which a request for SL HARQ feedback is made); and/or
- information about a reference signal (e.g., DMRS, etc.) related to decoding and/or channel estimation of data transmitted on the PSSCH, for example, information related to a pattern of a (time-frequency) mapping resource of DMRS, rank information, antenna port index information.

For example, the first SCI may include information related to channel sensing. For example, the receiving UE may decode the second SCI using the PSSCH DMRS. A polar code used for the PDCCH may be applied to the second SCI. For example, in the resource pool, the payload size of the first SCI may be the same for unicast, groupcast and broadcast. After decoding the first SCI, the receiving UE does not need to perform blind decoding of the second SCI. For example, the first SCI may include scheduling information about the second SCI.

In various embodiments of the present disclosure, since the transmitting UE may transmit at least one of SCI, the first SCI, and/or the second SCI to the receiving UE on the PSCCH, the PSCCH may be replaced/substituted with at least one of the SCI, the first SCI, and/or the second SCI. Additionally/alternatively, for example, the SCI may be replaced/substituted with at least one of the PSCCH, the first SCI, and/or the second SCI. Additionally/alternatively, for example, since the transmitting UE may transmit the second SCI to the receiving UE on the PSSCH, the PSSCH may be replaced/substituted with the second SCI.

Hereinafter, synchronization acquisition by an SL UE will be described.

In TDMA and FDMA systems, accurate time and frequency synchronization is essential. Inaccurate time and frequency synchronization may lead to degradation of system performance due to inter-symbol interference (ISI) and inter-carrier interference (ICI). The same is true for V2X. For time/frequency synchronization in V2X, a sidelink synchronization signal (SLSS) may be used in the PHY layer, and master information block-sidelink-V2X (MIB-SL-V2X) may be used in the RLC layer.

Tx/Rx Beam Sweep

In case of using a very high frequency such as mmWave, beamforming may be used to overcome pathloss in general. To use beamforming, a best beam pair should be detected from several beam pairs between a Tx end and an Rx end. Such a process may be referred as beam acquisition or beam tracking from the perspective of the Rx end. Particularly, since mmWave uses analog beamforming, a vehicle may need to perform beam sweeping of switching a beam to a different direction in a different time using an antenna array of the vehicle in the course of beam acquisition or beam tracking.

Multiple Active Sidelink BWPs

In NR V2X, communication based on supporting a plurality of BWPs (i.e., communication based on supporting a plurality of configured sidelink BWPs and/or communication through supporting a plurality of active sidelink BWPs) may be considered. The reason why the above-described operation is performed is to support heterogeneous services/communications that require different numerologies, parameters and/or requirements, or is to reduce ICI caused by a shortened CP length.

Figure 10:
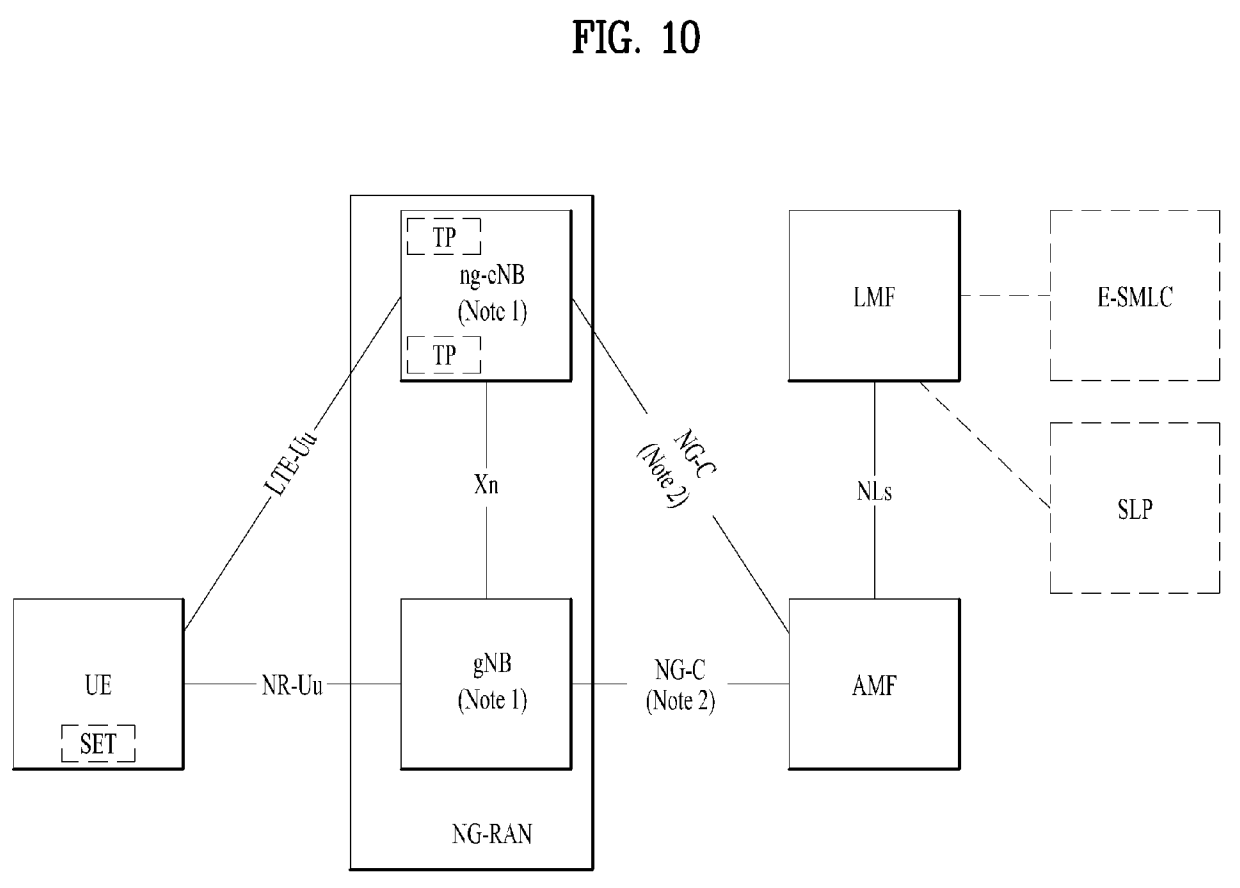

FIG. 10 illustrates architecture of a 5G system applicable to positioning of a UE connected to an NG-RAN or an E-UTRAN.

Referring to FIG. 10, an AMF may receive a request for a location service associated with a particular target UE from another entity such as a gateway mobile location center (GMLC) or the AMF itself decides to initiate the location service on behalf of the particular target UE. Then, the AMF transmits a request for a location service to a location management function (LMF). Upon receiving the request for the location service, the LMF may process the request for the location service and then returns the processing result including the estimated position of the UE to the AMF. In the case of a location service requested by an entity such as the GMLC other than the AMF, the AMF may transmit the processing result received from the LMF to this entity.

Anew generation evolved-NB (ng-eNB) and a gNB are network elements of the NG-RAN capable of providing a measurement result for positioning. The ng-eNB and the gNB may measure radio signals for a target UE and transmits a measurement result value to the LMF. The ng-eNB may control several transmission points (TPs), such as remote radio heads, or PRS-only TPs for support of a PRS-based beacon system for E-UTRA.

The LMF is connected to an enhanced serving mobile location center (E-SMLC) which may enable the LMF to access the E-UTRAN. For example, the E-SMLC may enable the LMF to support observed time difference of arrival (OTDOA), which is one of positioning methods of the E-UTRAN, using DL measurement obtained by a target UE through signals transmitted by eNBs and/or PRS-only TPs in the E-UTRAN.

The LMF may be connected to an SUPL location platform (SLP). The LMF may support and manage different location services for target UEs. The LMF may interact with a serving ng-eNB or a serving gNB for a target UE in order to obtain position measurement for the UE. For positioning of the target UE, the LMF may determine positioning methods, based on a location service (LCS) client type, required quality of service (QoS), UE positioning capabilities, gNB positioning capabilities, and ng-eNB positioning capabilities, and then apply these positioning methods to the serving gNB and/or serving ng-eNB. The LMF may determine additional information such as accuracy of the location estimate and velocity of the target UE. The SLP is a secure user plane location (SUPL) entity responsible for positioning over a user plane.

The UE may measure the position thereof using DL RSs transmitted by the NG-RAN and the E-UTRAN. The DL RSs transmitted by the NG-RAN and the E-UTRAN to the UE may include a SS/PBCH block, a CSI-RS, and/or a PRS. Which DL RS is used to measure the position of the UE may conform to configuration of LMF/E-SMLC/ng-eNB/E-UTRAN etc. The position of the UE may be measured by an RAT-independent scheme using different global navigation satellite systems (GNSSs), terrestrial beacon systems (TBSs), WLAN access points, Bluetooth beacons, and sensors (e.g., barometric sensors) installed in the UE. The UE may also contain LCS applications or access an LCS application through communication with a network accessed thereby or through another application contained therein. The LCS application may include measurement and calculation functions needed to determine the position of the UE. For example, the UE may contain an independent positioning function such as a global positioning system (GPS) and report the position thereof, independent of NG-RAN transmission. Such independently obtained positioning information may be used as assistance information of positioning information obtained from the network.

Figure 11:
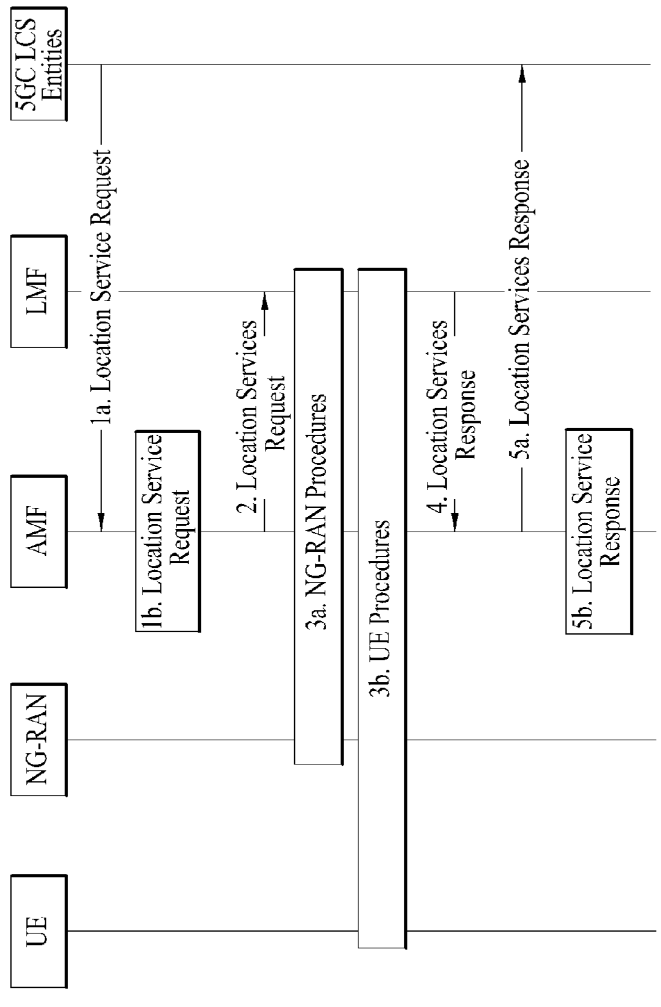
FIG. 11 is a diagram illustrating an implementation example of a network for measuring the UE position according to an example of the present disclosure.
Figure 12:
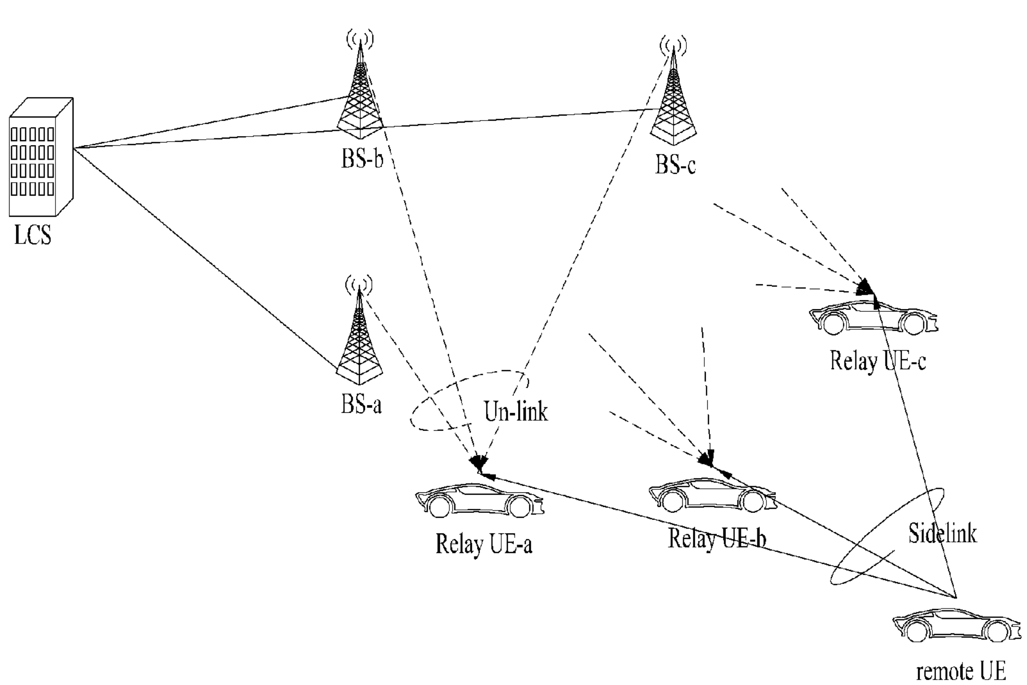
FIG. 12 is a diagram illustrating a method for measuring an absolute position of a remote UE based on a distance measurement result between a remote UE and a relay UE according to an embodiment of the present disclosure.

FIG. 11 illustrates an implementation example of a network for UE positioning.

When an AMF receives a request for a location service in the case in which the UE is in connection management (CM)-IDLE state, the AMF may make a request for a network triggered service in order to establish a signaling connection with the UE and to assign a specific serving gNB or ng-eNB. This operation procedure is omitted in FIG. 8. In other words, in FIG. 8, it may be assumed that the UE is in a connected mode. However, the signaling connection may be released by an NG-RAN as a result of signaling and data inactivity while a positioning procedure is still ongoing.

An operation procedure of the network for UE positioning will now be described in detail with reference to FIG. 11. In step 1*a*, a 5GC entity such as GMLC may transmit a request for a location service for measuring the position of a target UE to a serving AMF. Here, even when the GMLC does not make the request for the location service, the serving AMF may determine the need for the location service for measuring the position of the target UE according to step 1*b*. For example, the serving AMF may determine that itself will perform the location service in order to measure the position of the UE for an emergency call.

In step 2, the AMF transfers the request for the location service to an LMF. In step 3*a*, the LMF may initiate location procedures with a serving ng-eNB or a serving gNB to obtain location measurement data or location measurement assistance data. Additionally, in step 3*b*, the LMF may initiate a location procedure for DL positioning together with the UE. For example, the LMF may transmit the location assistance data to the UE or obtain a location estimate or location measurement value. Meanwhile, step 3*b* may be additionally performed after step 3*a* is performed, but may be performed instead of step 3*a*.

In step 4, the LMF may provide a location service response to the AMF. The location service response may include information as to whether UE positioning is successful and include a location estimate value of the UE. If the procedure of FIG. 8 has been initiated by step 1*a*, the AMF may transfer the location service response to a 5GC entity such as a GMLC. If the procedure of FIG. 8 has been initiated by step 1*b*, the AMF may use the location service response in order to provide a location service related to an emergency call.

Hereinafter, a Hybrid Automatic Repeat Request (HARQ) procedure will be described.

An error compensation scheme for ensuring communication reliability may include a Forward Error Correction (FEC) scheme and an Automatic Repeat Request (ARQ) scheme. In the FEC scheme, error at a reception end may be corrected by adding an extra error correction code to information bits. The FEC scheme is advantageous in that time delay is low and information that is separately transmitted and received between transmission and reception ends is not required, but is disadvantageous in that system efficiency is degraded in a fine channel environment. The ARQ scheme has high transmission reliability, but is disadvantageous in that time delay occurs and system efficiency is degraded in a poor channel environment.

The Hybrid Automatic Repeat Request (HARQ) scheme is obtained by combining the FEC and the ARQ, and in this case, performance may be improving performance by checking whether data received by a physical layer contains error that is not capable of being decoded and requesting retransmission when error occurs.

In the case of SL unicast and groupcast, HARQ feedback and HARQ combining at a physical layer may be supported. For example, when a reception UE operates in a resource allocation mode 1 or 2, the reception UE may receive a PSSCH from a transmission UE, and the reception UE may transmit HARQ feedback with respect to the PSSCH to the transmission UE using a Sidelink Feedback Control Information (SFCI) format through a physical sidelink feedback channel (PSFCH).

For example, the SL HARQ feedback may be enabled for unicast. In this case, in a non-Code Block Group (non-CBG) operation, the reception UE may decode the PSCCH with the reception UE as a target, and when the reception UE successfully decodes a transmission block related to the PSCCH, the reception UE may generate an HARQ-ACK. The reception UE may transmit the HARQ-ACK to the transmission UE. In contrast, when the reception UE decodes the PSCCH with the reception UE as a target and then does not successfully decode the transmission block related to the PSCCH, the reception UE may generate the HARQ-NACK. The reception UE may transmit the HARQ-NACK to the transmission UE.

For example, the SL HARQ feedback may be enabled for groupcast. For example, in the non-CBG operation, two HARQ feedback options may be supported for the groupcast.

(1) Groupcast option 1: When the reception UE decodes the PSCCH with the reception UE as a target and then fails in decoding the transmission block related to the PSCCH, the reception UE may transmit the HARQ-NACK to the transmission UE on the PSFCH. In contrast, when the reception UE decodes the PSCCH with the reception UE as a target and successfully decodes the transmission block related to the PSCCH, the reception UE may not transmit a HARQ-ACK to the transmission UE.

(2) Groupcast option 2: When the reception UE decodes the PSCCH with the reception UE as a target and then fails in decoding the transmission block related to the PSCCH, the reception UE may transmit the HARQ-NACK to the transmission UE on the PSFCH. When the reception UE decodes the PSCCH with the reception UE as a target and successfully decodes the transmission block related to the PSCCH, the reception UE may transmit the HARQ-ACK to the transmission UE on the PSFCH.

In case of mode 1 resource allocation, the time between a PSSCH and HARQ feedback transmission on PSFCH may be configured (in advance). For unicast and groupcast, if retransmission is required on the sidelink, such retransmission may be indicated to the base station (BS) by a UE within a coverage using a PUCCH. The transmission (Tx) UE may also transmit an indication message to the serving base station (BS) thereof. Here, the indication message may be configured in a form of SR (Scheduling Request)/BSR (Buffer Status Report) rather than HARQ ACK/NACK.

In addition, even if the base station (BS) does not receive the indication, the base station (BS) can schedule sidelink retransmission resources for the UE.

Embodiment 1

In Embodiment 1, in the NR-V2X communication system supporting a relay function, when a remote UE is located outside a network coverage of the base station (BS) or does not secure a Line of Sight (LoS) with the base station (BS), a method for effectively performing network-based positioning supported by the relay UE will hereinafter be described in detail.

In network-based positioning using a relay, a relay UE communicates with the remote UE through a sidelink and communicates with the base station (SB) through a Uu-link. At this time, the network may acquire relay UE-assisted information, which is information necessary for measuring the location of the relay UE, and remote UE-assisted information, which is necessary for location measurement of the remote UE, through the relay UE.

A network according to the embodiment may be a location server (LCS), LMF or base station capable of measuring/estimating/calculating the UE location, and the UE may include a vehicle, a mobile device, a V2X module, an IoT device, etc.

In the NR-V2X communication system supporting the relay function, the UEs can be broadly classified into a relay UE and a remote UE.

The relay UE may serve to transmit messages/information/signaling/RS (reference sequence) received from the remote UE to other remote UEs or base stations.

In particular, the present disclosure relates to technology for effectively performing a network-based positioning process for a remote UE that is located outside a network coverage or does not secure LoS with the base station in the NR-V2X system supporting a relay function. More particularly, the present disclosure relates to a method for positioning a remote UE and/or a relay UE at a network stage with the support of the relay UE located around the remote UE, and devices for the same. In the present embodiment, there is disclosed a hybrid positioning procedure in which a positioning process through sidelink can be used between the remote UE and the relay UE, and a positioning process through the Uu link can be used between the relay UE and the base station.

The network-based positioning for use in the conventional NR-V2X system has disadvantages in that positioning performance is deteriorated in the following cases 1), 2), and 3). That is, the first case 1) may refer to an example case in which the UE is located outside the network coverage of the base station (BS) so that the UE cannot receive a Uu-link Positioning Reference Sequence (Uu-PRS) from the BS through the Uu link. The second case 2) may refer to an example case in which the UE is located outside the BS network coverage and does not receive the Uu-PRS through the Uu link due to signal blocking caused by a tall building. The third case 3) may refer to a case in which the UE is located within the network coverage of the base station (BS) but has disadvantages in that positioning performance is deteriorated because LoS is not secured due to influence of the surrounding environment.

The present embodiment relates to technology for solving the above-described problems of the prior art, and proposes various network-based positioning methods that can be implemented using a relay in the NR-V2X system supporting a relay function.

Hereinafter, terms for description of the present embodiment will be described.

In a C-V2X (Cellular Vehicle-to-Everything) system, an upper layer may include an application layer and a facility layer.

A positioning mode may include a self-positioning mode and a cooperative positioning mode.

The self-positioning mode may be a method in which a positioning UE measures its own current position using only positioning measurement information measured by the positioning UE, without exchanging positioning measurement information with neighbor UEs or receiving positioning measurement information from the neighbor UEs.

The cooperative positioning mode may be a method in which a positioning UE measures its own current position using positioning measurement information received from the neighbor UEs as well as positioning measurement information measured by the positioning UE itself.

PRS may be broadly divided into a request PRS and a response PRS. The request PRS may be transmitted by a positioning UE or a positioning BS to a neighbor UE or a neighbor road side unit (RSU). The response PRS may be transmitted by the peripheral UE or the peripheral RSU in response to the request PRS.

PRS may also be divided into an SL-PRS transmitted through sidelink and a Uu-PRS transmitted through a Uu link.

PRS can be transmitted using various methods in various frequency bands (frequency-band or spectrum) as follows.

The PRS may be transmitted in a licensed band, may be transmitted in an unlicensed band, or may be transmitted in a dedicated ITS (Intelligent Transport Systems (ITS) frequency band.

When PRS transmission in the licensed band and PRS transmission in the ITS band are considered, the PRS may be transmitted using physical feedback channel (PSFCH) resources or may be transmitted using resources of a dedicated slot allocated for PRS transmission from among logical slots (or physical slots) of the NR-V2X system.

When PRS transmission in the unlicensed band is considered, resources for PRS transmission may share resources allocated for other heterogeneous UEs/APs (access points) such as Wi-Fi access points (APs), etc. In this case, the positioning UE may acquire resources through time division multiple access (TDMA) or contention with the heterogeneous UE/AP and the like, and may transmit the PRS using the acquire resources.

As a network-based positioning method using a relay that can be applied to the present disclosure, a DL-TDoA-R positioning method (Downlink TDoA (Time Difference of Arrival) positioning with relay), a Multi-cell RTT-R positioning method (Multi-cell RTT (Round Trip Time) positioning with relay), and a UL-TDoA-R positioning method (Uplink TDoA positioning with relay) may be used.

Hereinafter, network-based positioning methods using relays will be described in detail.

In the DL-TDoA-R positioning method, position measurement (i.e., positioning) of the relay UE may be performed through the DL-TDoA positioning method. In order to perform positioning of the remote UE, the following three different types of DL-TDoA-R positioning methods may be selectively used according to ranging information between the remote UE and the relay UE and positioning-related signaling information exchanged between the remote UE and the relay UE.

DL-TDoA-R positioning method 1: In DL-TDoA-R positioning method 1, the network may first measure the absolute position of the relay UE using the BS (base station) position information. Then, a relay UE in which reliability of the measured absolute position is equal to or greater than a predetermined threshold is regarded as an anchor node (AN) for positioning the remote UE, so that the absolute position for the remote UE can be measured. At this time, the absolute position of the relay UE can be measured through the DL-TDoA positioning method, and the absolute position of the remote UE may be measured by applying the UL-TDoA positioning method between the relay UE and the remote UE or a method similar to the UL-TDoA positioning method.

DL-TDoA-R positioning method 2: In the DL-TDoA-R positioning method 2, the network may first measure the absolute position of the relay UE using the BS (base station) position information. Then, a relay UE in which reliability of the measured absolute position is equal to or greater than a predetermined threshold is regarded as an anchor node (AN) for positioning the remote UE, so that the absolute position for the remote UE can be measured. At this time, the absolute position for the relay UE can be measured through the DL-TDoA positioning method, and the absolute position for the remote UE may be measured by applying the RTT positioning method between the relay UE and the remote UE or a method similar to RTT positioning.

DL-TDoA-R positioning method 3: In the DL-TDoA-R positioning method 3, the network may first measure the absolute position of the relay UE using the BS (base station) position information. Then, a relay UE in which reliability of the measured absolute position is equal to or greater than a predetermined threshold is regarded as an anchor node (AN) for positioning the remote UE, so that the absolute position for the remote UE can be measured. At this time, the absolute position for the relay UE can be measured through the DL-TDoA positioning method, and the absolute position for the remote UE may be measured using relative position information between the relay UE and the remote UE.

In the multi-cell RTT-R positioning method, the network may first measure the absolute position of the relay UE using the BS (base station) position information. Then, a relay UE in which reliability of the measured absolute position is equal to or greater than a predetermined threshold is regarded as the anchor node (AN) for positioning the remote UE, so that the absolute position of the remote UE can be measured. At this time, the absolute position of the relay UE can be measured through the multi-cell RTT positioning method, and the absolute position of the remote UE may be measured through the following method in the same or similar manner to the method proposed in the above-described DL-TDoA-R positioning.

As an example, the absolute position of the remote UE may be measured through either the UL-TDoA positioning method between the relay UE and the remote UE or a method similar to the UL-TDoA positioning method, may be measured through either the RTT positioning method between the relay UE and the remote UE or a method similar to the RTT positioning method, or may be measured using relative position information between the relay UE and the remote UE.

In the UL-TDoA-R positioning method, the network may first measure the absolute position of the relay UE using the BS (base station) position information. Then, a relay UE in which reliability of the measured absolute position is equal to or greater than a predetermined threshold is regarded as the anchor node (AN) for positioning the remote UE, so that the absolute position of the remote UE can be measured. At this time, the absolute position of the relay UE can be measured through the UL-TDoA positioning method, and the absolute position of the remote UE may be measured through the following method in the same as or similar manner to the method proposed in the above-described DL-TDoA-R positioning.

As an example, the absolute position of the remote UE may be measured through either the UL-TDoA positioning method between the relay UE and the remote UE or a method similar to the UL-TDoA positioning method, may be measured through either the RTT positioning method between the relay UE and the remote UE or a method similar to the RTT positioning method, or may be measured using relative position information between the relay UE and the remote UE.

Figure 13:
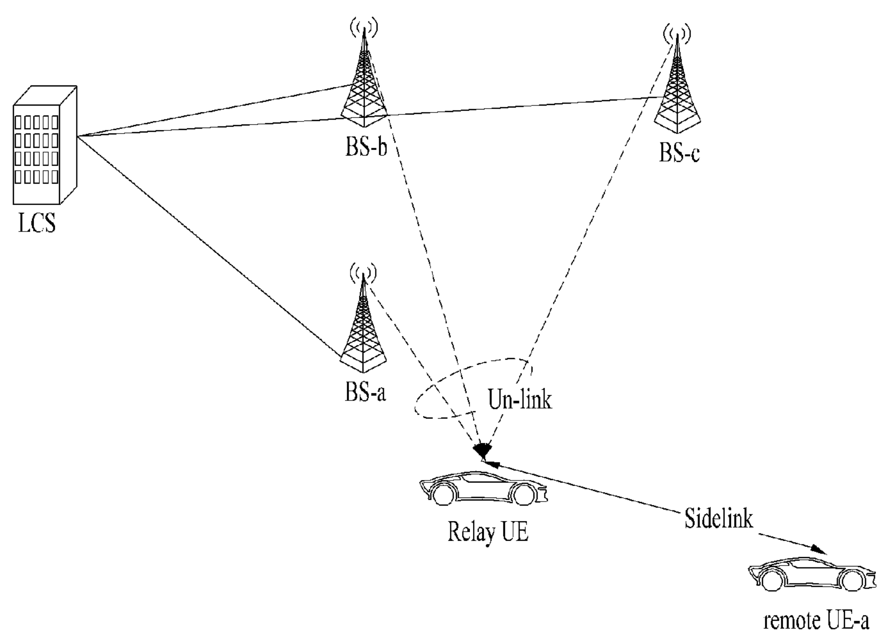
FIG. 13 is a diagram illustrating a method for measuring the absolute position of a remote UE based on relative position information between a remote UE and a relay UE according to an embodiment of the present disclosure.

FIG. 13 is a diagram illustrating a method for measuring the absolute position of a remote UE based on relative location information between a remote UE and a relay UE according to an embodiment of the present disclosure.

Referring to FIG. 13, when a relay UE is selected as an AN for positioning a remote UE, the absolute position of the remote UE can be measured by adding the relative position between the anchor node (AN) and the remote UE to the absolute position of the anchor node (AN).

In order to measure the 2D/3D position coordinates for the remote UE using relative position information, at least one relay UE should exist around the remote UE.

Relative position information between the remote UE and the relay UE may be obtained through RTT distance measurement (ranging) and AoA (Angle of Arrival) measurement through sidelink, or may be obtained using a distance measurement sensor mounted to the relay UE and/or the remote UE.

Relative position information measured or obtained by the remote UE may be transmitted to the relay UE through the sidelink.

The relay UE may transmit the relative position information received from the remote UE to a network (e.g., LCS) through the base station. The network may calculate the absolute position of the remote UE based on the pre-measured absolute position of the relay UE and relative position information on the remote UE. For example, the network may measure the absolute position of the relay UE based on pre-collected position information of the base station (BS).

As another example, the relay UE may measure its own absolute position based on a signal received from the peripheral base station (BS) according to a request of the network, and may transmit the measured absolute position to the network through the base station (BS). For example, the relay UE may measure the absolute position thereof by performing an Observed Time Difference of Arrival (OTDoA) positioning method with the peripheral base stations (BSs), and may transmit the measurement result to the network through the Uu-link. Here, in the OTDoA positioning method, the relay UE may use a measurement timing point of downlink signals received from a plurality of TPs including an eNB, an ng-eNB, and a PRS-dedicated TP. The relay UE may measure timing points of received downlink signals using assistance data received from the network (e.g., LCS), and may determine the absolute position thereof based on the timing measurement result and the geographic coordinates of the peripheral TPs.

The relay UE connected to a peripheral base station may request a measurement gap for OTDoA measurement from the peripheral TPs. If the relay UE does not recognize a system frame number (SFN) for at least one TP in the OTDoA assistance data, the relay UE may use an autonomous gap to obtain an SFN of the OTDoA reference cell before requesting a measurement gap for performing reference signal time difference (RSTD) measurement. Here, the RSTD may be defined based on the smallest relative time difference between boundaries of two subframes respectively received from the reference cell and the measurement cell. That is, the RSTD may be calculated based on the relative time difference between the start time of the subframe received from the measurement cell and the start time of the subframe of the nearest reference cell. Meanwhile, a reference cell may be selected by the relay UE.

For accurate OTDoA measurement, it is necessary to measure Time of Arrival (ToA) of signals received from three or more geographically distributed TPs or base stations. For example, the relay UE may measure the ToA for each of TP1, TP2 and TP3. RSTD for TP1-TP2, RSTD for TP2-TP3, and RSTD for TP3-TP1 may be calculated based on the three ToAs, geometric hyperbolas may be determined based on the calculated RSTDs, and a point where the hyperbolas cross each other can be estimated as the absolute position of the relay UE.

The network-based positioning procedure using each of the DL-TDoA-R positioning method (Downlink TDoA (Time Difference of Arrival) positioning with relay), the multi-cell RTT-R positioning method (Multi-cell RTT (Round Trip Time) positioning with relay) and the UL-TDoA-R positioning method (Uplink TDoA positioning with relay) will hereinafter be described in detail.

1) Network-Based Positioning Procedure Using DL-TDoA-R Positioning Method

The network may first measure the absolute position of the relay UE using BS (base station) position information. For example, when a positioning quality indicator (PQI) for the absolute position measured for each relay UE is higher than a pre-defined threshold, the corresponding relay UE can be determined to be the AN for measuring the absolute position of the corresponding remote UE. At this time, the threshold may be determined differently according to the position-related service type related to the corresponding remote UE. As another example, when a reference signal received poser (RSRP) or RSSI between the relay UE and the remote UE included in the remote UE-assisted information is higher than a predefined threshold, the corresponding relay UE may be determined to be the AN for the corresponding remote UE.

Hereinafter, the network-based positioning procedure according to DL-TDoA-R positioning method 1 will be described in detail.

The remote UE may transmit, to the relay UE selected as the AN through the sidelink, a packet and SL-PRS including signaling information that is necessary for the network to perform its own positioning.

When the relay UE receives, from the remote UE through the sidelink, signaling information and SL-PRS necessary for the network to perform positioning for the remote UE, the relay UE may measure ToA (Time of Arrival) using the received SL-PRS, and may measure the quality of the received packets and SL-PRS. For example, the relay UE may measure an RSSI or RSRP for the received packet, and may measure an RSRP for the SL-PRS.

The relay UE may measure the RSTD and quality of the Uu-PRS received from the base station through the Uu link. As an example, the relay UE may measure the RSRP for Uu-PRS.

The relay UE may transmit remote UE-assisted information and relay UE-assisted information to the base station using the Uu link, and the base station may transmit the received information to the network. The relay UE according to the embodiment may transmit remote UE-assisted information and relay UE-assisted information to the network using a radio channel link (e.g., a Wi-Fi communication link) other than the Uu link.

As an example, although the remote UE-assisted information and the relay UE-assisted information may be transmitted using a PUCCH and/or PUSCH, the scope of the present disclosure is not limited thereto, and the remote UE-assisted information and the relay UE-assisted information may also be transmitted through another separate radio link channel.

The relay UE-assisted information may refer to information requested by the network to perform positioning for the relay UE, and may include at least one of a cell ID, relay UE speed information, relay UE heading information, RSTD information measured for Uu PRS, time information at which the RSTD is measured, information about the quality of measured RSTD, and RSRP information for the Uu PRS.

The remote UE-assisted information may refer to information requested by the network that requests the relay UE to perform positioning for the remote UE. The remote UE-assisted information may include positioning-related signaling information received by the relay UE from the remote UE, and measurement information measured by the relay UE measuring the SL-PRS.

For example, the positioning-related signaling information received from the remote UE may include remote-UE ID information, remote-UE movement speed information, remote-UE heading information, etc.

For example, the measurement information measured for the SL-PRS may include ToA information measured for the received SL-PRS, time information for ToA measurement, quality level information for the measured ToA, RSRP information measured for the received SL-PRS, and the like.

The network may measure the absolute positions of the remote UE and the relay UE using the remote UE-assisted information and relay UE-assisted information obtained from the base station through the Uu link or obtained through other radio channel links.

First, the network may perform DL-TDoA positioning using relay UE-assisted information to finally measure the absolute position of the relay UE.

Thereafter, the network may regard the relay UE providing the remote UE-assisted information corresponding to the same remote UE ID as the anchor node (AN), and may perform UL-TDoA positioning based on the ToA information measured by each AN, thereby measuring the absolute position of the remote UE.

Hereinafter, the network-based positioning procedure according to DL-TDoA-R positioning method 2 will be described in detail.

In DL-TDoA-R positioning method 2, the network may first measure the absolute position of the relay UE using the BS (base station) position information, may regard the relay UE as the AN necessary for performing the remote-UE positioning, and may then measure the absolute position of the remote UE. At this time, the absolute position of the relay UE may be measured through the DL-TDoA positioning method, and the absolute position of the remote UE can be measured through either the RTT positioning method between the relay UE and the remote UE or a method similar to the RTT positioning.

Compared to DL-TDoA-R positioning method 1, DL-TDoA-R positioning method 2 can be operated in the same or similar manner to DL-TDoA-R positioning method 1, except for the distance measurement (ranging) operation through the RTT between the remote UE and the relay UE.

The relay UE may receive signaling information necessary for the network to perform positioning for the remote UE from the remote UE through sidelink, and may measure Time of Flight (ToF) by transmitting and receiving an SL-PRS. Here, the SL-PRS may include a request PRS transmitted by the relay UE to the remote UE through sidelink and a response PRS transmitted by the remote UE to the relay UE in response to the request PRS.

The relay UE may transmit remote UE-assisted information and relay UE-assisted information to the network through the Uu link (or other radio channel link).

Here, remote UE-assisted information may refer to information requested by the network that requests the relay UE to perform positioning for the remote UE. The remote UE-assisted information may include positioning-related signaling information received from the remote UE and measurement information obtained by the relay UE that measures the SL-PRS.

For example, the positioning-related signaling information received from the remote UE may include at least one of remote-UE ID information, remote-UE movement speed information, remote-UE heading information, ToF information (measured by the remote UE transmitting and receiving the SL-PRS to and from the relay UE), information about the ToF measurement time, quality level information about the measured ToF, and RSRP information about the SL-PRS.

For example, the measurement information obtained by the relay UE measuring the SL-PRS may include at least one of ToF information obtained by the relay UE that measures the SL-PRS to be transmitted and received, information about the ToF measurement time, quality level information for the measured ToA, and RSRP information measured for the SL-PRS.

In one embodiment, information related to ToF measurement may be obtained by any one of the remote UE and the relay UE. If the remote UE measures ToF, ToF-related information may be transmitted to the relay UE along with other positioning-related signaling information, and the relay UE may not perform ToF measurement.

In one embodiment, remote UE-assisted information may include UE information (e.g., 0: Relay UE, 1: Remote UE) measuring ToF.

The network can measure the absolute positions of the remote UE and the relay UE using remote UE-assisted information and relay UE-assisted information obtained from the base station through the Uu link or obtained through other radio channel links.

For example, the network may measure the absolute position of the remote UE by performing round trip time (RTT) positioning based on ToF information measured by the relay UE.

Hereinafter, a network-based positioning procedure according to DL-TDoA-R positioning method 3 will be described in detail.

In DL-TDoA-R positioning method 3, the network may first measure the absolute position of the relay UE using the BS (base station) position information, may regard the relay UE as the AN necessary for performing the remote-UE positioning, and may then measure the absolute position of the remote UE. At this time, the absolute position of the relay UE may be measured through the DL-TDoA positioning method, and the absolute position of the remote UE can be measured using relative position information between the relay UE and the remote UE.

Compared to DL-TDoA-R positioning method 1, DL-TDoA-R positioning method 2 can be performed in the same or similar manner to DL-TDoA-R positioning method 1, except for measurement of a relative position between the remote UE and the relay UE.

The relay UE may receive signaling information necessary for the network to perform positioning for the remote UE from the remote UE through sidelink, and may obtain relative position information on the remote UE. At this time, the relative position for the remote UE may be measured by the relay UE or the remote UE.

Here, the relative position information for the remote UE can be obtained through any one of the following two methods.

For example, the relay UE or the remote UE may transmit and receive the SL-PRS composed of a request PRS and a response PRS, and may finally measure the relative position of the remote UE based on the distance between the relay UE and the remote UE and the AoA measured for the received SL-PRS.

As another example, the relay UE or the remote UE may measure the relative position of the remote UE using an internally mounted sensor.

If the remote UE measures the relative position with the relay UE through an internally mounted sensor, the relative position information 1) may be transferred from the remote UE to the relay UE through a first SCI and/or second SCI of the PSCCH, and/or a PSCCH in the NR-V2X service slot structure, or 2) may be transferred from the remote UE to the relay UE through the first SCI and/or second SCI of the PSCCH in a slot structure dedicated for NR-V2X sidelink positioning.

On the other hand, when the relay UE measures the relative position with the remote UE through an internally mounted sensor, the remote UE may not transmit relative position information to the relay UE. Of course, according to the embodiment, even when the relay UE measures the relative position with the remote UE through an internally mounted sensor, the remote UE may transmit relative position information to the relay UE for more accurate relative position measurement according to the positioning service type.

The relay UE may transmit remote UE-assisted information and relay UE-assisted information to the network through a Uu link (or other radio channel link).

The relay UE-assisted information may include Cell ID information, relay-UE speed information, relay-UE heading information, RSTD information measured for Uu PRS, time information at which RSTD is measured, quality level information for the measured RSTD, and RSRP information for Uu PRS.

The remote UE-assisted information may refer to information requested by the network that requests the relay UE to perform positioning for the remote UE, and may include the positioning-related signaling information that is received by the relay UE from the remote UE and measurement information measured by the relay UE using the SL-PRS or a distance measurement sensor.

For example, the positioning-related signaling information received from the remote UE may include at least one of remote-UE ID information, remote-UE speed information, remote-UE heading information, relative position information (or distance and AoA measurement information) of the remote UE with respect to the relay UE measured using the distance measurement sensor included in the remote UE or relative position information of the relay UE with respect to the remote UE measured by the remote UE, time information at which relative position is measured by the remote UE, quality level information for the relative position measured by the remote UE, information (e.g., 0: Method using the SL-PRS, 1: Method using the distance measurement sensor) about the positioning method used when the remote UE measures the relative position, and reception (Rx) power intensity information for a signal used for relative position measurement.

For example, the measurement information measured by the relay UE using the SL-PRS or the distance measurement sensor may include at least one of relative position information of the remote UE with respect to the relay UE, relative position information of the relay UE with respect to the remote UE, time information at which relative position is measured, quality level information for the measured relative position, information (e.g., 0: Method using the SL-PRS, 1: Method using the distance measurement sensor) about the positioning method used for the relative position measurement, and reception (Rx) power intensity information for a signal used for relative position measurement.

In an embodiment, relative position measurement may be performed by any one of the remote UE and the relay UE. If the remote UE performs relative position measurement, the remote UE may transmit the obtained relative position-related information to the relay UE along with other positioning-related signaling information.

In an embodiment, the remote UE-assisted information may include UE information (e.g., 0: Relay UE, 1: Remote UE) for measuring relative position.

The network may measure the absolute position of the remote UE using the remote UE-assisted information and relay UE-assisted information obtained through a base station (or other radio channel link).

The network can measure the absolute position of the remote UE, based on the absolute position information of the relay UE providing the remote UE-assisted information and the relative position information between the remote UE and the relay UE. For example, the network may calculate the absolute position of the remote UE by adding the relative position of the remote UE with respect to the relay UE to the absolute position of the relay UE.

Hereinafter, a network-based positioning method based on the multi-cell RTT-R positioning method will be described in detail.

In the multi-cell RTT-R positioning, the network may first measure the absolute position of the relay UE using the BS (base station) position information. Then, a relay UE in which reliability of the measured absolute position is equal to or greater than a predetermined threshold is regarded as an anchor node (AN) for positioning the remote UE, so that the absolute position of the remote UE can be measured. At this time, the absolute position of the relay UE can be measured through the Multi-cell RTT positioning method, and the absolute position of the remote UE may be measured by any one of the following methods in the same or similar manner to the method proposed by the DL-TDoA-R positioning.

For example, the absolute position of the remote UE may be measured through the UL-TDoA positioning method between the relay UE and the remote UE or a method similar to the UL-TDoA positioning method.

As another example, the absolute position of the remote UE may be measured through the RTT positioning method between the relay UE and the remote UE or a method similar to the RTT positioning method.

As another example, the absolute position of the remote UE may be measured using relative position information between the relay UE and the remote UE.

Hereinafter, the network-based positioning method based on the UL-TDoA-R positioning method will be described in detail.

In UL-TDoA-R positioning, the network may first measure the absolute position of the relay UE using the BS (base station) position information. Then, a relay UE in which reliability of the measured absolute position is equal to or greater than a predetermined threshold is regarded as an anchor node (AN) for positioning the remote UE, so that the absolute position for the remote UE can be measured. At this time, the absolute position of the relay UE can be measured through the UL-TDoA-R positioning method, and the absolute position of the remote UE may be measured by any one of the following methods in the same or similar manner to the method proposed by the DL-TDoA-R positioning.

For example, the absolute position of the remote UE may be measured through the UL-TDoA positioning method between the relay UE and the remote UE or a method similar to UL-TDoA positioning.

As another example, the absolute position of the remote UE may be measured through the RTT positioning method between the relay UE and the remote UE or a method similar to the RTT positioning method.

As another example, the absolute position of the remote UE may be measured using relative position information between the relay UE and the remote UE.

Figure 14:
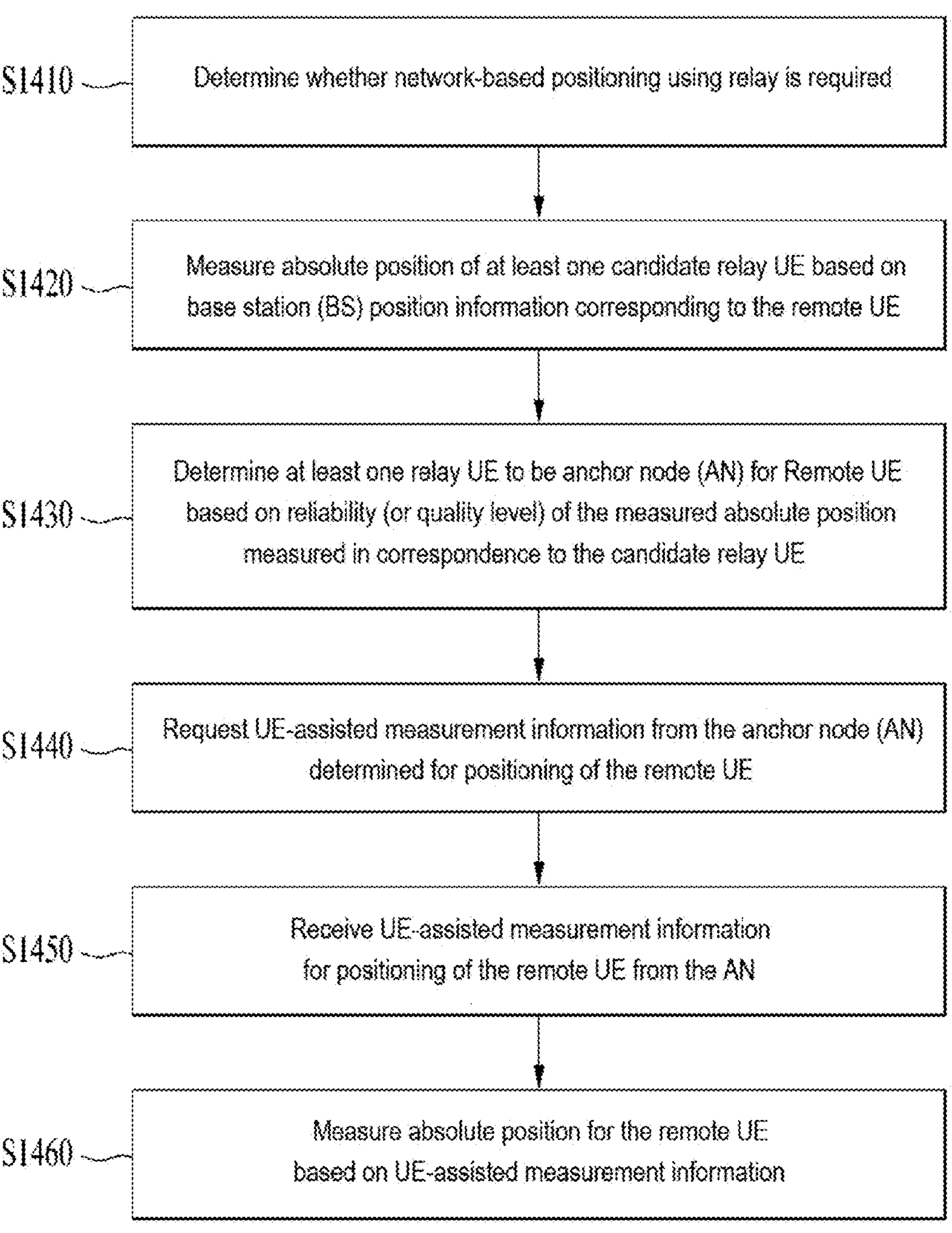
FIG. 14 is a flowchart illustrating a network-based positioning method using a relay according to an embodiment of the present disclosure.

FIG. 14 is a flowchart illustrating a network-based positioning method using a relay according to an embodiment of the present disclosure.

Referring to FIG. 14, the network may determine whether network-based positioning using a relay is required (S1410). For example, if there is detected at least one of a first case in which the network determines that the remote UE to be used as a positioning target is out of the BS (base station) coverage, a second case in which the remote UE serving as a positioning target does not secure the LOS with the base station (BS) while being located within the base station (BS) coverage, a third case in which a reception error rate (e.g., bit error rate (BER) or block error rate (BLER)) of a packet received from the remote UE exceeds a predetermined reference value, a fourth case in which radio link failure (RLF) is sensed, and a fifth case in which the beam problem is sensed, this means that network-based positioning using the relay is required.

If it is determined that network-based positioning using a relay is necessary, the network may measure the absolute position of at least one candidate relay UE based on BS (base station) position information corresponding to the remote UE (S1420). Here, the base station corresponding to the remote UE may include at least one of a base station currently in an RRC_CONNECTED state and a base station last connected before entering the RRC_IDLE state.

The network may determine at least one relay UE as an anchor node (AN) for the remote UE based on the reliability (or quality level) of the absolute position measured corresponding to the candidate relay UE(s) (S1430). Here, the candidate relay UE(s) may refer to a UE equipped with a relay function that is currently connected to or accessible to a base station corresponding to the remote UE.

The network may request UE-assisted measurement information from the AN determined for positioning of the remote UE (S1440). Here, the type of UE-assisted measurement information requested by the network may be determined differently based on the determined number of ANs and the capabilities of the ANs.

The network may receive UE-assisted measurement information for positioning of the remote UE from the anchor node (AN) (S1450).

The network may measure the absolute position of the remote UE based on the received UE-assisted measurement information (S1460).

In the embodiment of FIG. 14, the UE-assisted measurement information may include the aforementioned relay UE-assisted information and remote UE-assisted information.

The absolute position of the remote UE may be measured through the UL-TDoA positioning method between the relay UE and the remote UE or a method similar to the UL-TDoA positioning method, may be measured through the RTT positioning method between the relay UE and the remote UE or a method similar to the RTT positioning method, or may be measured using relative position information between the relay UE and the remote UE.

In an embodiment, the absolute position measurement method for the remote UE may be determined based on at least one of the positioning service type of the remote UE, the positioning capabilities of the relay UE and the remote UE, and the number of relay UEs (i.e., the number of ANs) that can participate in positioning of the remote UE.

The network may measure the absolute position of the AN(s) based on the UE-assisted measurement information received from the relay UE.

As described above, the network-based positioning method using a relay UE according to the present embodiment has an advantage in that the network can improve positioning performance for the remote UE having deteriorated positioning performance by cooperating with the relay UE.

In addition, the network-based positioning method using a relay according to various embodiments of the present disclosure can adaptively provide various positioning methods based on a positioning service type, positioning capability of the UE, and the number of available anchor nodes (ANs), thereby providing a positioning solution optimized for the UE and network situations.

In addition, the network-based positioning method using a relay according to various embodiments of the present disclosure can effectively improve positioning performance of the remote UE having deteriorated positioning performance through cooperation with the relay UE without additional network expansion.

Embodiment 2

In Embodiment 2, a procedure for performing a positioning protocol (PP) for DL-TDoA-R positioning in the NR-V2X system supporting the relay function and the relay UE-assisted measurements for the same are proposed.

As described in Example 1, the LCS may request assistance measurement information from the relay UE in order to measure the absolute positions of the remote UE and the relay UE. Here, the assistance measurement information may include relay UE-assisted information and remote UE-assisted information.

Compared to the PP procedure for performing DL-TDoA positioning using only the conventional Uu link, the PP procedure for DL-TDoA-R positioning proposed in the present embodiment 2 may include a first process 1) in which the relay UE obtains relay UE-assisted information (such as RSTD/RSRP, etc.) required for the network to measure the absolute position of the relay UE using the Uu-PRSs received from the reference cell and the neighbor cell in response to an LCS request, and a second process 2) in which the relay UE obtains, from the remote UE, the remote UE-assisted information required for the network to measure the absolute position of the remote UE through sidelink communication.

Hereinafter, terms used in the following technology will be described.

The network may be an LCS, LMF or base station capable of measuring/estimating/calculating the UE position, and the base station (BS) may include eNB, gNB, LTE-LAA, NR-U, TP (Transmission Point), RHC (Remote Head Control), gNB-type RSU (Road-Side Unit), etc., each of which can provide fixed (or absolute) position information.

The UE may include a vehicle, a mobile device, an automated guided vehicle (AGV), a vulnerable roadside unit (VRU), and the like.

In the DL-TDoA-R positioning process using the sidelink and the Uu link, the UE may be classified into a relay UE and a remote UE. In this case, the remote UE may refer to any one of a first UE (1), a second UE (2), and a third UE (3). The first UE (1) may refer to a UE that does not receive the Uu-PRS from the base station (BS) while being located outside the network coverage of the base station (BS). The second UE (2) may refer to a UE that does not receive the Uu-PRS due to signal blocking caused by a tall building or the like while being located within the network coverage of the base station (BS). The third UE (3) may refer to a UE that does not secure the LoS due to the surrounding environment while being located within the network coverage of the base station (BS). On the other hand, the relay UE may refer to a UE that is located within the BS (base station) coverage and can easily secure the LoS with the base station. As main functions of the relay UE, the relay UE may acquire information necessary for the network to measure the absolute position of the remote UE through sidelink communication with the remote UE, and may transmit the acquired information to the corresponding base station (BS).

The positioning information storage device may be a device that stores all assistance data used for DL-TDoA-R positioning.

For DL-TDoA-R positioning, as described in Embodiment 1, three methods according to DL-TDoA-R positioning methods 1 to 3 may be considered. The description of DL-TDoA-R positioning methods 1 to 3 can be replaced with the description of the first embodiment (Embodiment 1).

The network may determine whether network-based positioning using a relay is required. The network may determine whether positioning using a relay is required based on whether at least one of the following four events 1), 2), 3), and 4) has occurred.

1) The first event 1 may refer to a case in which the network confirms that a positioning target UE is located outside the base station (BS) coverage.
2) The second event 2 may refer to a case in which the network confirms that positioning performance is deteriorated because the LoS between the base station (BS) and the positioning target UE is not secured due to the environmental factors such as interference caused by multipath propagation and signal attenuation.
3) The third event 3 may refer to a case in which the network fails to perform position tracking of the positioning target UE.
4) The fourth event 4 may refer to a case in which the positioning target UE is located outside the base station (BS) coverage or the LoS between the positioning target UE and the base station (BS) is not secured due to environmental factors such as interference caused by multipath propagation and signal attenuation so that positioning performance is expected to be deteriorated, thereby directly requesting the network to perform positioning using the relay.

When at least one of the above-mentioned four events is detected, the network regards the measurement target UE as a remote UE, requests assistance measurement information necessary for positioning of the remote UE from the relay UE located around the remote UE, and may obtain assistance measurement information from the relay UE.

When a positioning target UE directly requests positioning using a relay from the network, the positioning target UE may make a direct request through the Uu link or may make a request through another UE located within a predetermined radius from a peripheral region thereof.

Hereinafter, a procedure for performing a positioning protocol (PP) for DL-TDoA-R positioning will be described in detail.

Figure 15:
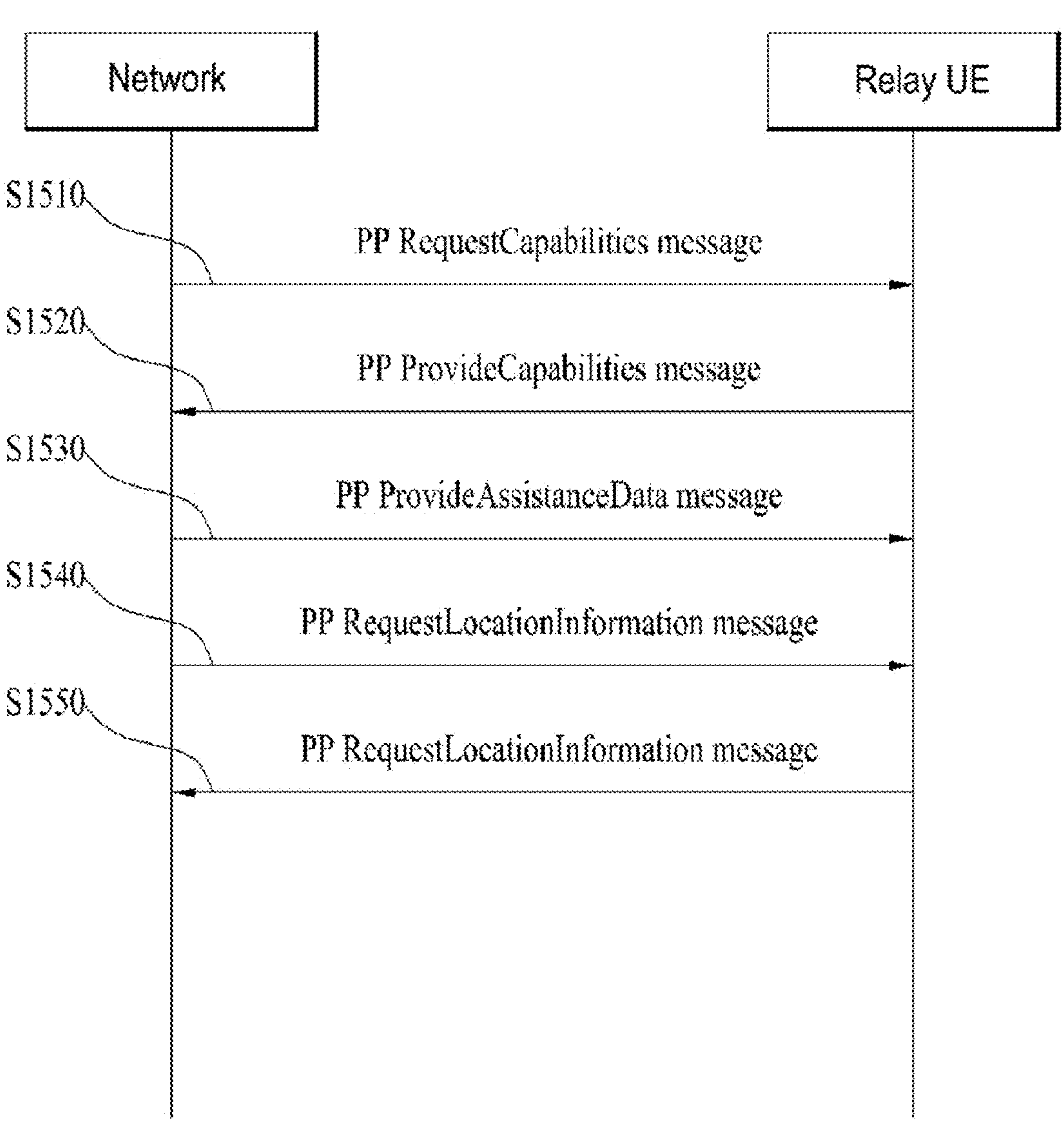
FIG. 15 is a flowchart illustrating a procedure for performing a positioning protocol (PP) for DL-TDoA-R positioning according to an embodiment of the present disclosure.

FIG. 15 is a flowchart illustrating a procedure for performing a positioning protocol (PP) for DL-TDoA-R positioning according to an embodiment of the present disclosure.

Referring to FIG. 15, the network (LCS) may transmit a PP RequestCapabilities message to the relay UE (S1510). The network may request the relay UE to report capabilities necessary for the LCS to perform network-based positioning using the sidelink and the Uu link through the PP RequestCapabilities message.

For example, the PP RequestCapabilities message may include a remote UE ID by which the network can report and receive capability information. The relay UE can receive (default) capability information from the UE corresponding to the remote UE ID included in the PP RequestCapabilities message, and can transmit the received capability information to the network.

For example, when the remote UE located outside the base station (BS) coverage requests the neighbor relay UE to perform positioning, the relay UE may receive (default) capabilities of the remote UE from the remote UE and may transmit the received information to the network.

In an embodiment, when the remote UE is located within the base station (BS) coverage, the network may directly transmit a RequestCapabilities message to the remote UE. In this case, the network can directly report and receive capabilities of the remote UE required for performing network-based positioning using the sidelink and the Uu link from the remote UE through the Uu link.

The network may receive a PP ProvideCapabilities message from the relay UE in response to the PP RequestCapabilities message (S1520).

In this case, the PP ProvideCapabilities message may include various capability information for supporting the following DL-TDoA-R positioning.

The PP ProvideCapabilities message may broadly include relay UE Capability information and remote UE Capability information for supporting DL-TDoA-R positioning.

The relay UE capability information may include the following information.

1) Information on DL-TDoA-R positioning mode supported by Relay UE: PP may support only the relay UE-assisted mode, and the relay UE-based mode may be supported by PPe.
2) Information as to whether the relay UE supports inter-frequency RSTD measurement
3) Information as to whether the relay UE supports distance and relative position measurement required to measure the absolute position of the remote UE using the sidelink between the remote UE and the frequency.
4) DL-TDoA-R positioning method that can be supported by the relay UE: The DL-TDoA-R positioning method capable of being supported can be mapped to a 2-bit value and signaled as follows.
   00: Proposed DL-TDoA-R positioning method-1
   01: Proposed DL-TDoA-R positioning method-2
   10: Proposed DL-TDoA-R positioning method-3
   11: Proposed DL-TDoA-R positioning methods-1/2/3 can all be supported
5) If the relay UE can support the DL-TDoA-R positioning method-3, information as to whether the relay UE can measure the relative position between the relay UE and the remote UE or information as to whether the relay UE can obtain the relative position between the relay UE and the remote UE from the remote UE may be mapped to a 2-bit value and then signaled.

00: This means an example case in which the relay UE can perform distance measurement (ranging) using sidelink and can measure relative position through AoA measurement.

01: This means an example case in which the remote UE can perform distance measurement (ranging) using sidelink and can measure the relative position through AoA measurement.

10: This means an example case in which the relay UE can measure the relative position using the distance measurement (ranging) sensor mounted therein.

11: This means an example case in which the remote UE can perform the relative position measurement using the distance measurement sensor mounted therein.

6) When relative position measurement between the relay UE and the remote UE is possible using sensors, various information about related sensors can be used.

7) Information about supportable frequency bands in which the relay UE can measure the RSTD using a Uu link 8) Information about supportable frequency bands that can measure the following distance and relative position information required for the network to measure the absolute position of the remote UE by using the sidelink with the remote UE by the relay UE.

DL-TDoA-R positioning method-1: ToA measured by the relay UE

DL-TDoA-R positioning method-2: ToF (or distance) between the relay UE and the remote UE DL-TDoA-R positioning method-3: Relative position between the relay UE and the remote UE Remote UE capability information may include the following information.

If the remote UE is within the BS (base station) coverage or if the remote UE can perform capability reporting to the network through the relay UE in a situation where the remote UE is located outside the BS coverage, the remote UE may transmit a ProvideCapabilities message to the LCS in response to the RequestCapabilities message. In this case, the message may include the following capabilities for DL-TDoA-R positioning support.

1) Information about the positioning mode in which the remote UE can perform positioning for the relay UE: PP supports only the remote UE-assisted mode, and the remote UE based mode can be supported by PPe.

2) Information on whether the remote UE supports inter-frequency RSTD measurement 3) Information on whether the remote UE supports distance and relative position measurement required to measure the absolute position for the relay UE using sidelink between the relay UE and the frequency 4) Information on the DL-TDoA-R positioning method that can be supported by the remote UE: The supportable DL-TDoA-R positioning method can be signaled by mapping to a 2-bit value as follows.

00: DL-TDoA-R positioning method-1

01: DL-TDoA-R positioning method-2

10: DL-TDoA-R positioning method-3

11: DL-TDoA-R positioning methods-1/2/3 can all be supported.

5) If the remote UE supports DL-TDoA-R positioning method-3, information on the method used by the remote UE to measure the relative position between the relay UE and the remote UE can be used. In this case, the method to be used for relative position measurement can be defined as follows.

00: This means an example case in which the remote UE can perform distance measurement (ranging) using sidelink and can measure relative position through AoA measurement.

01: This means an example case in which the relative position between the relay UE and the remote UE can be measured using the distance measurement sensor mounted in the remote UE.

6) When the relative position between the relay UE and the remote UE can be measured using a distance measurement sensor, information on related sensors can be used.

7) Information on supportable frequency bands that enable the remote UE to measure the following distance and/or relative position information required for the network to measure the absolute position of the remote UE using the sidelink with the relay UE, can be used.

DL-TDoA-R positioning method-1: ToA measured by Relay UE

DL-TDoA-R positioning method-2: ToF (or distance) between Relay UE and Remote UE DL-TDoA-R positioning method-3: Relative Position between Relay UE and Remote UE The network may transmit a PP ProvideAssistanceData message to the relay UE (S1530). Here, the PP ProvideAssistanceData message may include cell-related information and remote UE-related information.

The relay UE may obtain relay UE-associated information based on cell-related information. In order to perform DL-TDoA-R positioning, the relay UE needs to perform RSTD measurement using the Uu link. At this time, information on neighbor cells of the relay UE is required for RSTD measurement. The relay UE may measure the RSTD based on the cell-related information received from the network and generate relay UE-associated information including the measured RSTD and other information related to the measured RSTD.

In addition, the remote UE-associated information may be used to obtain the remote UE-associated information requested by the network using sidelink.

For example, the network may provide, through the PP ProvideAssistanceData message, a guide for a method of reporting 1) information related to a reference cell and a candidate neighbor cell for RSTD measurement, 2) remote UE-associated information, and 3) information about relay UE-associated measurements composed of relay UE-associated information and remote UE-associated information.

Hereinafter, information to be transmitted through the PP ProvideAssistanceData message will be described in detail.

1) Information (DL-TDoA Reference Cell Info) related to the reference cell, which is provided for performing DL-TDoA positioning through the Uu link of the relay UE: Elements included in the related information may include a physical cell ID (PCI) for the reference cell and various parameter information related to PRS configuration.

2) Information (DL-TDoA Neighbor Cell Info) related to neighbor candidate cells provided to perform DL-TDoA positioning through the Uu link of relay UE: Elements included in the related information may include various parameter information related to PCH and PRS configuration of each neighbor cell related to the reference cell. The list of neighbor cells may be provided in descending order in consideration of priority, and the relay UE can report the measured RSTD to the network in the same descending order.

3) Information (Remote UE Info) related to the remote UE provided to obtain remote UE-assisted information through the sidelink of the relay UE: Elements included in the related information may include information about the positioning method with the remote UE so as to obtain a remote UE ID (or UE ID) (or the list of remote UE IDs) for the remote UE located within a predetermined radius from the relay UE as well as the remote UE-assisted information. Here, the positioning method to be performed with the remote UE may include the above-described DL-TDoA-R positioning methods 1 to 3. When DL-TDoA-R positioning method 1 or 2 is performed, information about the positioning method may include SL-PRS configuration information between the relay UE and the remote UE, which is required for distance measurement through sitelink, and information on various related parameters. When the remote UE is located within the BS (base station) coverage, the SL-PRS configuration method between the relay UE and the remote UE and various related parameters may be determined by the network (LCS and/or base station). On the other hand, when the remote UE is located outside the coverage of the base station, the SL-PRS configuration method and related parameters between the relay UE and the remote UE may be determined by the network based on the capability information of the remote UE. Here, the capability information of the remote UE is transmitted to the network through the relay UE. In addition, when the remote UE is located outside the BS coverage, the SL-PRS configuration between the relay UE and the remote UE and various parameters related thereto can be determined through a sensing process for detecting whether or not the SL-PRS is used between UEs and a process for reserving an unused SL-PRS.

The list of remote UEs may be reported through two methods as follows.

First, when the network has the latest position information of the remote UE, a list of remote UE IDs arranged in descending or ascending order may be provided in consideration of priority according to the distance between the relay UE and the remote UE, and the relay UE may report the obtained remote UE-assisted information to the network in the same order—that is, in the order according to the remote UE ID list received from the network.

Second, when the network does not have the latest position information of the remote UE, the relay UE may report, to the network, the remote UE-assisted information obtained in consideration of the priority according to RSRP or RSSI obtained in the positioning process through the sidelink with the remote UE.

4) Information for supporting DL-TDoA positioning of Relay UE: Elements included in the related information may provide a guide for information that the relay UE must provide to the network in order for the network to perform DL-TDoA-R positioning. For example, information for supporting DL-TDoA positioning of the relay UE may include at least one of information about a maximum number of relay UE-associated information pieces that the relay UE can report to the network, information about parameters included in the relay UE-associated information that the relay UE can report to the network, information about a maximum number of remote UE-associated information pieces that the relay UE can report to the network, and information about parameters included in the remote UE-associated information that the relay UE must report to the network.

The network may transmit a PP RequestLocationInformation message to the relay UE (or remote UE) to request assistance measurement information necessary for performing DL-TDoA-R positioning (S1540).

The network may directly transmit a PP RequestLocationInformation message to the remote UE in order to obtain assistance measurement information necessary for performing DL-TDoA-R positioning when the remote UE is located within the coverage of the base station. In addition, the network may transmit a PP RequestLocationInformation message to the remote UE through the relay UE when the remote UE is located outside the BS coverage but can receive messages through the relay UE.

For example, the PP RequestLocationInformation message may include at least one of 'Location Information Type' information, 'Required Accuracy' information, 'Response Time' information, and 'Environment Characterization' information.

The 'location information type' information may be set to location measurement for a UE-assisted mode.

The required accuracy information may include location estimation accuracy information. In the case of DL-TDoA positioning for the relay UE, the location estimation accuracy may be calculated by the network using the RSTD measured by the relay UE. On the other hand, according to the remote UE positioning, the location estimation accuracy may be calculated by the network using the absolute position information measured by the relay UE, information about the distance measurement between the remote UE and the relay UE included in the remote UE-assisted information, or relative position information between the remote UE and the relay UE.

The response time may refer to a maximum time duration ranging from a start time where the relay UE (or remote UE) receives the PP RequestLocationInformation message to an end time where the relay UE (or remote UE) transmits a PP ProvideLocationInformation message to be described later. For example, the response time may be determined by the network based on capabilities of the relay UE and/or remote UE, the positioning service type, and the like.

The environmental characteristics (Environment Characterization) information may include channel environment information such as multipath fading expected for the region where the relay UE is located, or may include information as to whether or not LoS is secured. The network may collect channel environment information from cells located around the relay UE and provide the collected channel environment information to the relay UE.

The network may receive a PP ProvideLocationInformation message from the relay UE in response to the PP RequestLocationInformation message (S1550).

The relay UE may obtain remote UE-assisted measurement information and relay UE-assisted measurement information using assistance information provided from the network. The relay UE may transmit UE-assisted measurement information composed of the remote UE-assisted measurement information and the relay UE-assisted measurement information to the network through the PP ProvideLocationInformation message, after the response time has elapsed.

Elements included in the PP ProvideLocationInformation message for each DL-TDoA-R measurement method may be defined as follows.

In DL-TDoA-R positioning method 1, the relay UE-assisted measurement information may include at least one of a cell ID, relay-UE speed information, relay-UE heading information, RSTD information measured using a Uu-PRS for each cell, time stamp information for RSTD measurement, quality level information about the measured RSTD, and RSRP information about the received Uu-PRS. The remote UE-assisted measurement information may include at least one of a remote UE ID, remote-UE speed information, ToA information measured using the SL-PRS, time information where the ToA is measured, quality level information about the measured ToA, and RSRP information about the received SL-PRS.

In DL-TDoA-R positioning method 2, relay UE-assisted measurement information may be configured with the same information as in the DL-TDoA-R positioning method 1. The remote UE-assisted measurement information may include at least one of a remote UE ID, remote-UE speed information, remote-UE heading information, ToF information between the remote UE and the relay UE, which is measured using the SL-PRS, time information where ToF was measured, quality level information for measured ToF, RSRP information for the received SL-PRS, and information about the UE measuring the ToF.

In DL-TDoA-R positioning method 2, the relay UE-assisted measurement information may be configured with the same information as those of the DL-TDoA-R positioning method 1. The remote UE-assisted measurement information may include at least one of a remote UE ID, remote-UE speed information, remote-UE heading information, information about the relative position of the remote UE with respect to the relay UE, information about the relative position of the relay UE with respect to the remote UE, information about the relative position of the relay UE with respect to another relay UE, quality level information about the measured relative position, time information where the relative position was measured, receive (Rx) power intensity information about the signal used for relative position measurement, information about a method used for relative position measurement, and information about the UE measuring the relative position.

As described above, the present disclosure provides a new positioning protocol using the relay UE, thereby effectively performing network-based positioning of the remote UE unable to receive the Uu-PRS from a base station.

In addition, the procedure for performing the network-based positioning protocol for the above-mentioned DL-TDoA-R positioning can be easily applied to Multi-cell RTT-R positioning (Multi-cell RTT positioning with Relay) and UL-TDoA-R positioning (UL-TDoA positioning with Relay).

FIG. 16 is a flowchart illustrating a procedure for performing network-based positioning using a relay UE according to an embodiment of the present disclosure.

Referring to FIG. 16, the network may transmit a PP RequestCapabilities message to the relay UE selected as the anchor node (AN) (S1601).

The relay UE may obtain default capability information of the remote UE through predetermined control signaling through sidelink (S1602 to S1603).

For example, upon receiving the PP RequestCapabilities message, the relay UE may transmit a default capability request to the corresponding remote UE to receive a default capability response including default capability information of the remote UE.

The relay UE may transmit a PP ProvideCapabilities message including its own capability information and the remote UE's default capability information to the network through the Uu link (S1604).

The network may transmit a PP ProvideAssistanceData message including cell-related information and remote UE-related information to the relay UE (S1605).

Thereafter, the network may transmit a PP RequestLocationInformation message to the relay UE, and may start transmitting the Uu-PRS (S1606 and S1607).

Upon receiving the PP RequestLocationInformation message, the relay UE may request location information from the remote UE and transmit the SL-PRS (S1608 and S1609).

The relay UE may acquire relay UE-assisted measurement information based on the cell-related information (S1610).

The remote UE may perform a positioning operation based on the received SL-PRS when location information transmission is requested from the relay UE (S1611).

The remote UE may transmit a positioning signaling signal including a positioning result to the relay UE, and may transmit an SL-PRS (S1612).

The relay UE may obtain remote UE-assisted measurement information based on the positioning signaling and SL-PRS that are received from the remote UE (S1613).

The relay UE may transmit UE-assisted measurement information composed of relay UE-assisted measurement information and remote UE-assisted measurement information to the network through a PP ProvideLocationInformation message (S1614).

The network may measure the absolute position of the remote UE based on the UE-assisted measurement information (S1615). Here, the network may measure the absolute position of the relay UE based on the UE-assisted measurement information.

Figure 17:
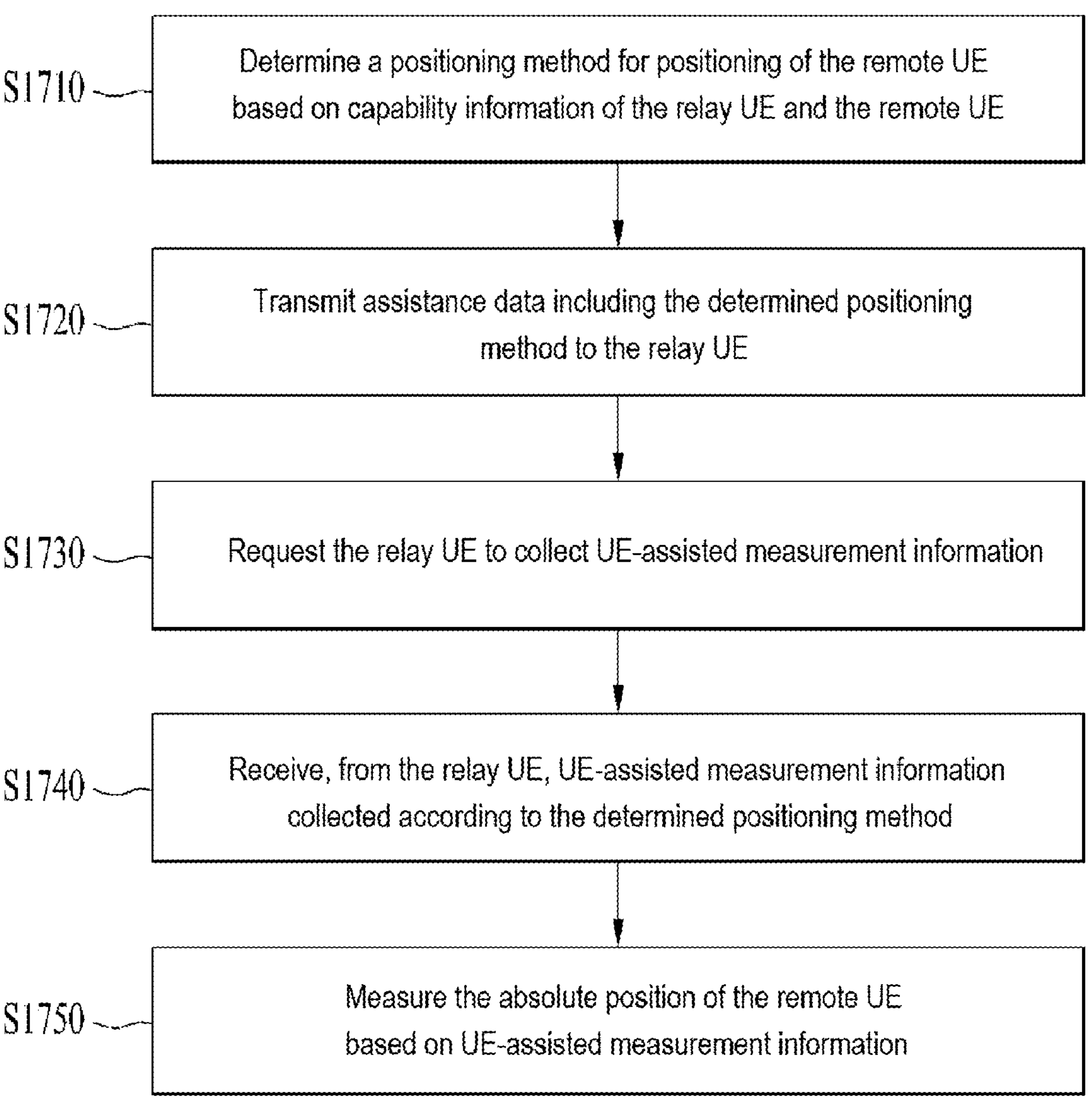
FIG. 17 is a flowchart illustrating a network-based positioning method using a relay based on UE capabilities according to an embodiment of the present disclosure.

FIG. 17 is a flowchart illustrating a network-based positioning method using a relay based on UE capabilities according to an embodiment of the present disclosure.

Referring to FIG. 17, the network may determine a positioning method for positioning the remote UE based on capability information of the relay UE and the remote UE (S1710).

In this case, the positioning method for measuring the position of the remote UE may broadly include a DL-TDoA-R positioning method, a multi-cell RTT-R positioning method, and a UL-TDoA-R positioning method. In addition, the DL-TDoA-R positioning method may include the above-described DL-TDoA-R positioning methods 1 to 3 in detail.

The network may transmit auxiliary data including the determined positioning method to the Relay UE (S1720).

The network may request the relay UE to collect UE-assisted measurement information (S1730).

The network may receive the UE-assisted measurement information collected according to the determined positioning method from the relay UE (S1740). Here, the UE-assisted measurement information may include relay UE-assisted measurement information and remote UE-assisted measurement information.

The network may measure the absolute position of the remote UE based on the UE-assisted measurement information (S1750).

In an embodiment, the above-described positioning method may include a DL-TDoA-R positioning method, a multi-cell RTT-R positioning method, and a UL-TDoA-R positioning method.

In an embodiment, the above-described positioning method may also be determined based on the number of relay UEs determined as ANs for positioning of the remote UE.

Hereinafter, an LTE positioning protocol (LPP) for performing network-based cooperative OTDoA positioning and a UE-assisted measurement procedure will be described in detail.

Figure 18:
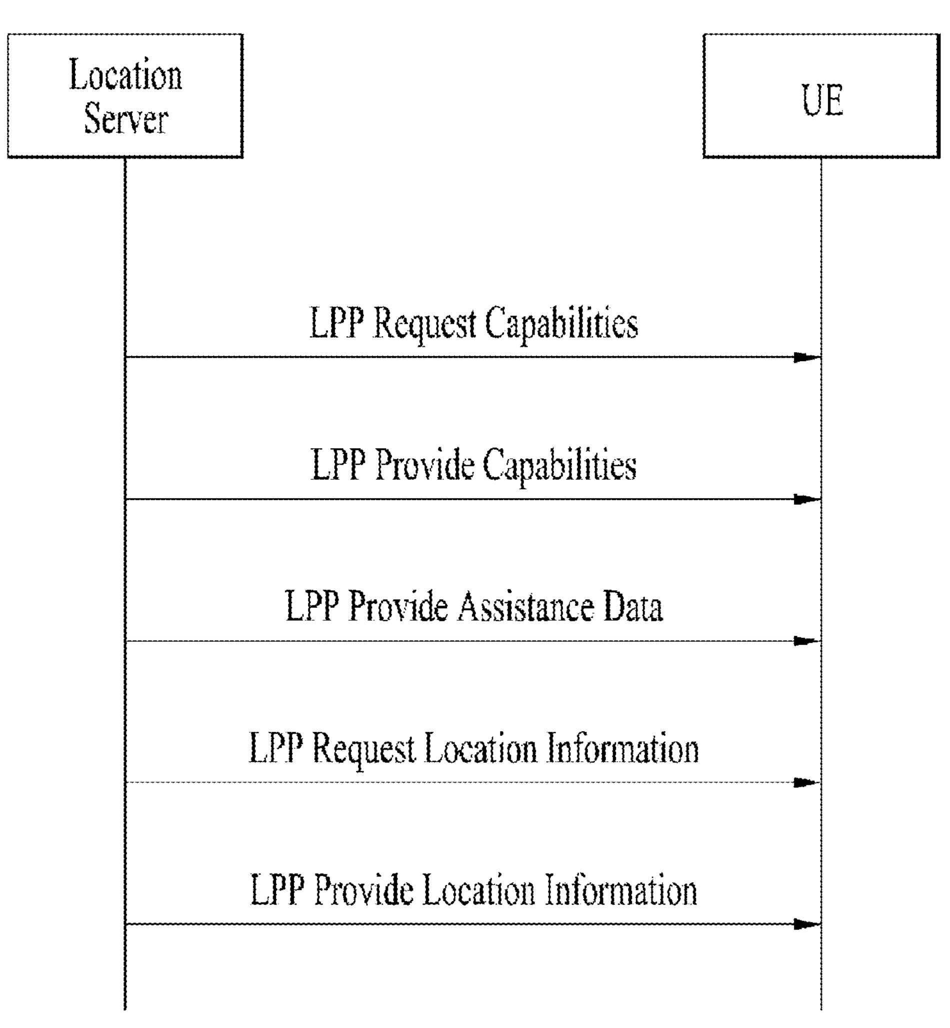
FIG. 18 is a flowchart illustrating an LPP main procedure performed between the LCS and the UE according to an embodiment of the present disclosure.

FIG. 18 is a flowchart illustrating an LPP main procedure performed between the LCS (E-SMLC or SUPL SLP) and the UE according to an embodiment of the present disclosure.

The UE according to the present embodiment may be a relay UE configured to perform positioning of a remote UE having deteriorated positioning performance.

A description of each procedure is as follows.

LPP Request Capabilities: The LCS may transmit a RequestCapabilities message to the UE. In this case, the message may request a report on the capabilities of the UE required for the LCS to perform cooperative OTDoA positioning.

LPP Provide Capabilities: The UE may transmit a ProvideCapabilities message to the LCS in response to the RequestCapabilities message. At this time, the ProvideCapabilities message may include information on the OTDoA positioning mode, information on supportable frequency bands in which the UE can measure RSTD, information on whether the UE supports inter-frequency RSTD measurement, etc. In an embodiment, the ProvideCapabilities message may further include information on whether or not the UE can measure the relative position of the neighbor UE, information about a method for enabling the UE to measure the relative position of the neighbor UE or information about a ranging sensor, information about a method used by the UE measuring the relative position of the neighbor UE or information about the ranging sensor capability, information about an optimal separation distance, a minimum separation distance and a maximum separation distance of the ranging sensor used by the UE measuring the relative position of the neighbor UE, information about the peripheral object identification capability of the ranging sensor used by the UE measuring the relative position of the neighbor UE, information about the type and size of the UE used to measure the relative position of the neighbor UE, information about the UE position where the ranging sensor used by the UE measuring the relative position of the neighbor UE is mounted, information about a method for measuring the amount of change in UE position changing in response to the UE movement and a sensor for the method, information about a method for measuring the heading angle of the UE and a sensor for the method, and the like.

The OTDoA positioning mode supported by the UE may be divided into a non-cooperative OTDoA positioning mode and a cooperative OTDoA positioning mode. At this time, LPP may support only the UE-assisted mode, and the UE-based mode may be supported by LPPe.

The UE may measure the relative position of neighbor UEs using Lidar or LASER or may measure the relative position of neighbor UE using sidelink.

The UE may measure a plurality of relative positions of a peripheral object at an arbitrary Hz and then use the calculated variance value as an index for determining the accuracy level of the ranging sensor.

The UE may maximize the relative position measurement performance of the peripheral object through the optimal separation distance of the ranging sensor used to measure the relative position of the neighbor UE, and may guarantee the relative position measurement performance of the peripheral object at a predetermined level through the minimum separation distance and the maximum separation distance between the peripheral object and the ranging sensor.

The peripheral object identification capability of the ranging sensor used by the UE measuring the relative position of the neighbor UE may be determined based on resolution (e.g., the distance between the peripheral objects capable of being identified), a maximum number of peripheral objects capable of being identified at a predetermined resolution, the speed at which the peripheral objects are identified, and the like. Here, as for the speed of identifying peripheral objects, the higher the identification capability of the ranging sensor, the faster the speed of measuring the distance between the peripheral objects. As a result, it is possible to rapidly measure the distance between the objects located around the UE.

Information related to the type and size of a UE for measuring the relative position of the peripheral UE may include information about horizontal and vertical lengths of all UEs when each UE is set to a vehicle, information about the installation position of the ranging sensor used by the UE that measures the relative position of the peripheral UE, information about a method and sensor used to measure the amount of position change according to movement of the UE, information about a method and sensor used to measure a heading angle of the UE, and the like. Here, when the UE is a vehicle, the ranging sensor may be located at a front bumper or a rear bumper of the vehicle. A sensor such as an inertial measurement device may be used as a sensor used to measure the amount of position change according to movement of the UE, and a yaw rate sensor may be used as a sensor used to measure the heading angle (or direction) of the UE.

LPP Provide Assistance Data: In order for the UE to measure the RSTD, information about the cell is required. Accordingly, the LCS sends the UE the following information related to the reference cell and candidate neighbor cell for RSTD measurement through the ProvideAssistanceData message.

Reference cell-related information (OTDoA Reference Cell Info) for performing cooperative/non-cooperative OTDoA positioning: Elements included in the related information provide various parameters related to PCI (Physical Cell ID) and PRS configuration for the reference cell.

Information (OTDoA Neighbor Cell Info) related to neighbor candidate cells for performing cooperative/non-cooperative OTDoA positioning: Elements included in the related information may provide various parameters related to PCI and PRS configuration for each neighbor cell related to the reference cell. The list of neighbor cells may be provided in descending order in consideration of priority. The UE may report the measured RSTD to the LCS in the same descending order when reporting the measured RSTD to the LCS.

Information for cooperative OTDoA positioning support: Elements included in the related information can provide a guide for information that the UE must provide to the LCS in order for the LCS to perform cooperative OTDoA positioning. In this case, the elements included in the related information may include the number (up to X) of relative positions of a maximum number of neighbor UEs capable of being reported by the UE having performed such measurement. The list of relative positions of the neighbor UEs reported by the UE to the LCS may be recorded after the UE measures the relative positions of the neighbor UEs in a clockwise or counterclockwise direction based on global coordinates (or UE heading). At this time, each relative position may be recorded in the list like a temporary ID for the corresponding UE. At this time, the ID may be generated by sequentially assigning numbers or may be generated as an arbitrary ID. The list of relative positions of the neighbor UEs reported by the UE to the LCS may include heading information of the UE recorded when each relative position is measured. In this case, each piece of heading information may be recorded using the same ID as the temporary ID for the corresponding UE used when recording the relative position, or may be recorded using another arbitrary ID.

There may be one piece of heading information reported by the UE to the LCS. In this case, as an exemplary embodiment, one piece of heading information may be reported as an average value of heading angles recorded after the UE completes the measurement of the relative position of the neighbor UEs.

"Location change due to movement of the UE during a time difference between the time when the UE measures the RSTD and the time when the relative position of the neighbor UE is measured" reported to the LCS by the UE may be included in the list of relative positions of the neighbor UEs or may be written as a separate list. At this time, the information about the amount of position change may be recorded using the same ID as the temporary ID for the corresponding UE used when recording the relative position or may be recorded using another arbitrary ID.

There may be one piece of position change information according to UE movement reported by the UE to the LCS. In this case, as an embodiment, one piece of heading information may be reported as an average value of position change according to UE movement recorded after the UE completes the measurement of the relative position of the neighbor UE.

LPP Request Location Information: The LCS may transmit a RequestLocationInformation message so as to request the UE to measure the relative position of the neighbor UE (necessary for supporting RSTD and cooperative OTDoA positioning) and other additional information that can improve performance of other cooperative positioning. At this time, the RequestLocationInformation message may include information about location information type, desired accuracy, response time, environment characterization, and the like. In this case, the location information type may be set to a UE-assisted mode. In the non-cooperative OTDoA positioning in relation to the desired accuracy, the location estimation accuracy may be calculated using the RSTD measured in the UE through the LCS. On the other hand, in the cooperative OTDoA positioning, the location estimation accuracy can be calculated using 1) the absolute position estimated by the LCS using the RSTD measured in the positioning UE, and using 2) the absolute position of the positioning UE estimated by the LCS using both the RSTD measured in the neighbor UE and the relative position of the neighbor UE. In relation to the response time, the UE may transmit the ProvideLocationInformation message to the LCS after the response time (or a waiting time) has elapsed after receiving the RequestLocationInformation message. Regarding environment characterization information, the LCS may provide the UE with channel environment information such as expected multipath or LoS for the area in which the UE is located.

LPP Provide Location Information: After receiving the RequestLocationInformation message, the UE may measure information for RSTD and cooperative OTDoA support using assistance information provided from the LCS, and may transmit a ProvideLocationInformation message to the LCS after lapse of the response time. The ProvideLocationInformation message may include various elements, for example, a timestamp at which the UE measures the RSTD, a timestamp at which the UE measures the relative position of the neighbor UE and additional information related to the relative position, a ToA (Time of Arrival) quality measured from a reference cell, the list of RSTDs (e.g., up to 24 RSTDs) measured from a reference cell and a neighbor cell, the list of relative positions (e.g., up to X positions) of the neighbor UEs measured by the UE, the UE heading information recorded when the relative position of the neighbor UE is measured, the quality of measured heading information, the amount of position change (measured in response to movement of the UE during a time difference between one timestamp at which the UE measures the RSTD recorded in a process of measuring the relative position of the neighbor UE and the other timestamp at which the relative position of the neighbor UE is measured), the quality of measured position change amount, etc. Here, the RSTD list measured from the reference cell and the neighbor cell may include information about the measured neighbor cell ID, the RSTD measurement value, and the measured RSTD quality. Here, as for the relative position quality of the measured neighbor UE, a plurality of relative positions with respect to the neighbor UE may be measured at an arbitrary Hz, and the measurement result may be provided as a calculated variance value.

Since examples of the above-described proposals can also be used as implementation methods of the present disclosure, it will also be apparent that the examples of the above-described proposals may be considered to be a kind of proposed methods. Although the above-described proposals can be implemented independently from each other, it should be noted that the above-described proposals can also be implemented as a combination (or a merged format) of some proposals. Rules can be defined in a manner that information about whether the above-described proposed methods are applied (or information about the rules of the proposed methods) can be signaled from the BS to the UE through pre-defined signaling (e.g., physical layer signaling or higher layer signaling).

Communication System Example to which the Present Disclosure is Applied

Although not limited thereto, various descriptions, functions, procedures, proposals, methods, and/or operational flow charts of the present disclosure disclosed in this document may be applied to various fields requiring wireless communication/connection (5G) between devices.

Hereinafter, it will be illustrated in more detail with reference to the drawings. In the following drawings/description, the same reference numerals may exemplify the same or corresponding hardware blocks, software blocks, or functional blocks, unless otherwise indicated.

Figure 19:
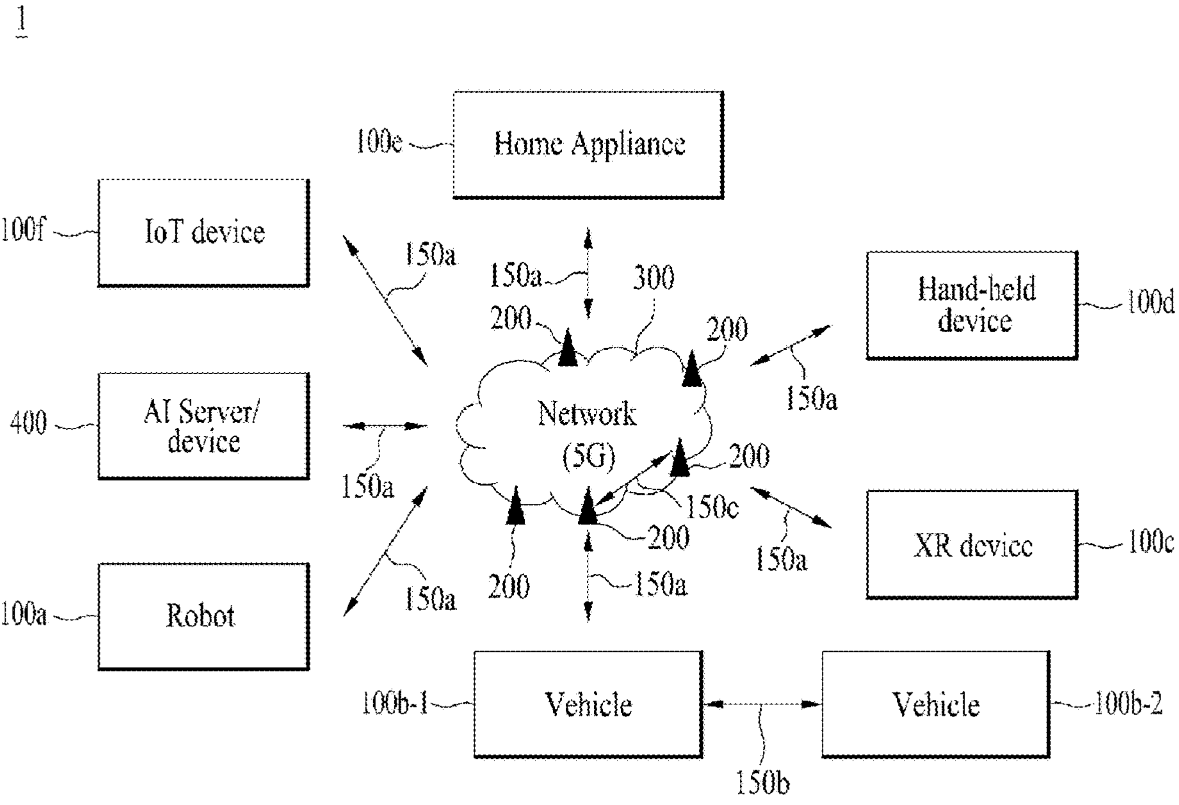
FIG. 19 illustrates a communication system applied to the present disclosure.

FIG. 19 illustrates a communication system applied to the present disclosure.

Referring to FIG. 19, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100*a*, vehicles 100*b*-1 and 100*b*-2, an eXtended Reality (XR) device 100*c*, a hand-held device 100*d*, a home appliance 100*e*, an Internet of Things (IoT) device 100*f*, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200*a* may operate as a BS/network node with respect to other wireless devices.

The wireless devices 100*a* to 100*f* may be connected to the network 300 via the BSs 200. An AI technology may be applied to the wireless devices 100*a* to 100*f* and the wireless devices 100*a* to 100*f* may be connected to the AI server 400 via the network 300. The network 300 may be configured using a 3G network, a 4G (e.g., LTE) network, or a 5G (e.g., NR) network. Although the wireless devices 100*a* to 100*f* may communicate with each other through the BSs 200/network 300, the wireless devices 100*a* to 100*f* may perform direct communication (e.g., sidelink communication) with each other without passing through the BSs/network. For example, the vehicles 100*b*-1 and 100*b*-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100*a* to 100*f*.

Wireless communication/connections 150*a*, 150*b*, or 150*c* may be established between the wireless devices 100*a* to 100*f*/BS 200, or BS 200/BS 200. Herein, the wireless communication/connections may be established through various RATs (e.g., 5G NR) such as uplink/downlink communication 150*a*, sidelink communication 150*b* (or, D2D communication), or inter BS communication (e.g. relay, Integrated Access Backhaul(IAB)). The wireless devices and the BSs/the wireless devices may transmit/receive radio signals to/from each other through the wireless communication/connections 150*a* and 150*b*. For example, the wireless communication/connections 150*a* and 150*b* may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

The server according to the embodiment may provide various positioning-related services by interworking with wireless devices through a wired/wireless integrated network.

The server may include at least one processor and at least one memory, and may further include at least one transceiver. The processor may control the memory and/or the transceiver and may be configured to implement the descriptions, functions, procedures, proposals, methods, and/or operational flowcharts disclosed in this document. For example, the processor may process information within the memory to generate first information/signal and then transmit a radio signal including the first information/signal through the transceiver. The processor may receive a radio signal including second information/signal through the transceiver and then store information obtained by processing the second information/signal in the memory. The memory may be coupled to the processor and store various types of information related to operations of the processor. For example, the memory may store software code including commands for performing a part or all of processes controlled by the processor or for performing the descriptions, functions, procedures, proposals, methods, and/or operational flowcharts disclosed in this document. Here, the processor and the memory may be a part of a communication modem/circuit/chip designed to implement wired communication technology. The transceiver may be coupled to the processor and transmit and/or receive signals through a wired network. The transceiver may include a transmitter and/or a receiver. The transceiver may be interchangeably used with the transceiver.

The server may perform an operation for determining the absolute position (or relative position) of the UE according to the embodiments for performing the network-based positioning method in the NR-V2X system described in FIGS. 12 to 18. For example, the above-described operation may include receiving a UE-assisted measurement information request message for UE positioning from the server when positioning using a relay is required based on whether the positioning performance of the UE is deteriorated; transmitting, to the server, the UE-assisted measurement information generated based on the positioning signaling and SL-PSR received from the remote UE; measuring the absolute position of the UE by the server based on the UE-assisted measurement information; and classifying the UE to be positioned using the relay as a remote UE. Here, the UE-assisted measurement information may include relay UE-assisted measurement information for performing positioning of the relay UE and remote UE-assisted measurement information for performing positioning of the remote UE.

Examples of Wireless Devices to which the Present Disclosure is Applied

Figure 20:
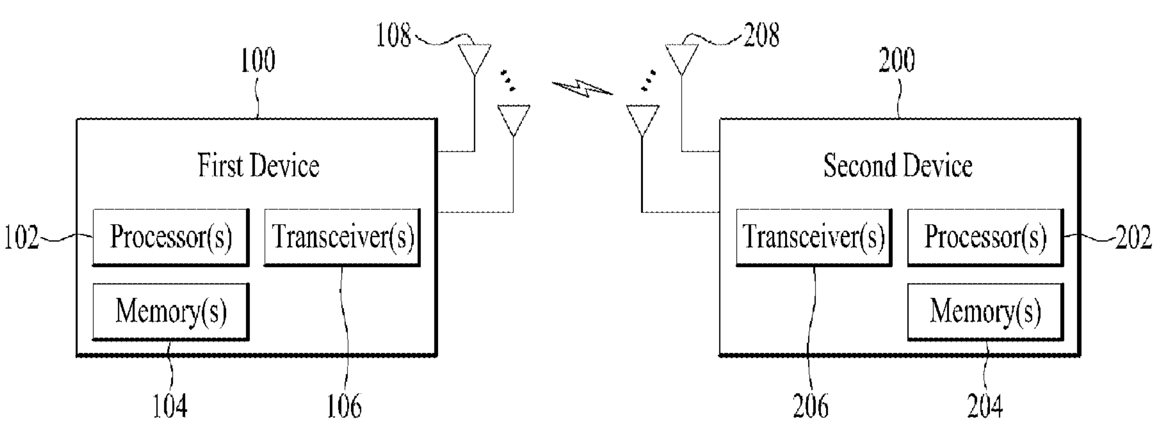
FIG. 20 illustrates wireless devices applicable to the present disclosure.

FIG. 20 illustrates a wireless device applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100*x* and the BS 200} and/or {the wireless device 100*x* and the wireless device 100*x*} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information acquired by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

Specifically, the UE or a vehicle may include a processor 102 and a memory 104 connected to the RF transceiver. The memory 104 may include at least one program capable of performing operations related to the embodiments described with reference to FIGS. 12 to 18.

The processor 102 may perform, based on the program included in the memory 104, an operation for determining the absolute position (or a relative position) of the UE according to the embodiments for performing the network-based positioning method in the NR-V2X system described in FIGS. 12 to 18.

Alternatively, the processor 102 and the memory 104 may be included in a chipset. In this case, the chipset may include at least one processor and at least one memory operatively connected to the at least one processor and configured to, when executed, cause the at least one processor to perform an operation. The processor 102 may perform an operation for determining the absolute position (or a relative position) of the UE according to embodiments for performing the network-based positioning method in the NR-V2X system described in FIGS. 12 to 18 based on a program included in the memory 104.

Alternatively, a computer readable storage medium including at least one computer program for causing the at least one processor to perform an operation may be provided.

The processor 102 may perform an operation for determining the absolute position (or a relative position) of the UE according to embodiments for performing the network-based positioning method in the NR-V2X system described in FIGS. 12 to 18 based on a program included in the memory 104.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information acquired by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

The processor 202 may perform an operation for determining the absolute position (or a relative position) of the UE according to embodiments for performing the network-based positioning method in the NR-V2X system described in FIGS. 12 to 18 based on a program included in the memory 204.

Alternatively, the processor 202 and the memory 204 may be included in a chipset. In this case, the chipset may include at least one processor and at least one memory operatively connected to the at least one processor and configured to, when executed, cause the at least one processor to perform an operation. The processor 202 may perform an operation for determining the absolute position (or a relative position) of the UE according to embodiments for performing the network-based positioning method in the NR-V2X system described in FIGS. 12 to 18 based on a program included in the memory 104.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Examples of Wireless Devices to which the Present Disclosure is Applied

Figure 21:
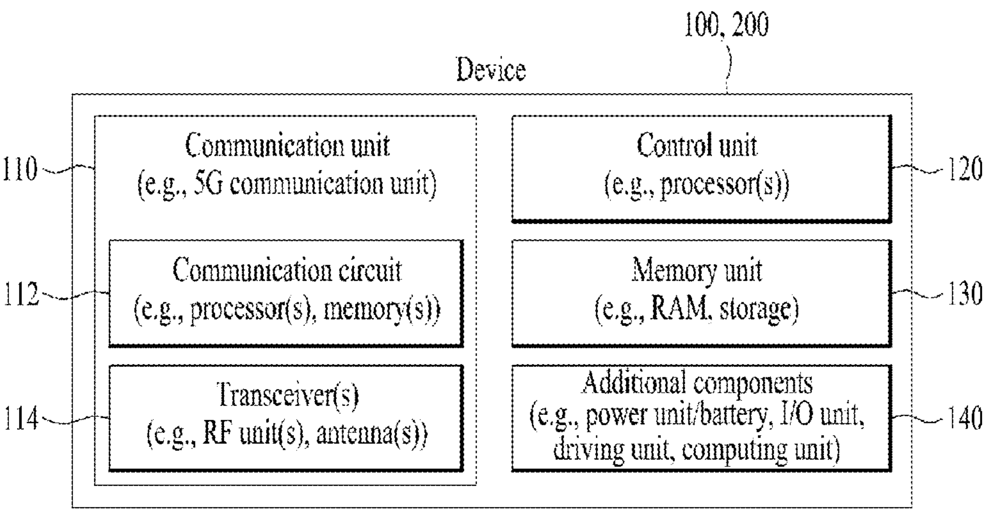
FIG. 21 illustrates another example of a wireless device to which the present disclosure is applied.

FIG. 21 illustrates another example of a wireless device applied to the present disclosure. The wireless device may be implemented in various forms according to a use-case/service (refer to FIG. 19)

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 19), the vehicles (100*b*-1 and 100*b*-2 of FIG. 19), the XR device (100*c* of FIG. 19), the hand-held device (100*d* of FIG. 19), the home appliance (100*e* of FIG. 19), the IoT device (100*f* of FIG. 19), a digital broadcast terminal, a hologram device, a public safety device, an MTC device, a medicine device, a fintech device (or a finance device), a security device, a climate/environment device, the AI server/device (400 of FIG. 19), the BSs (200 of FIG. 19), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 22:
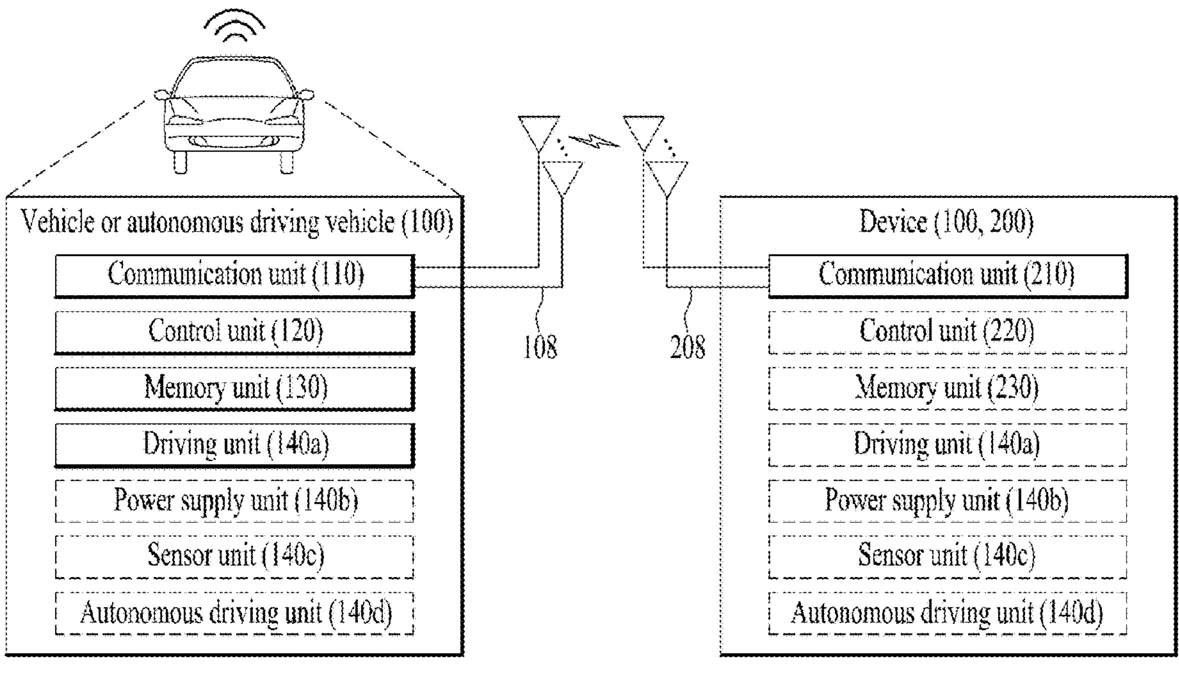
FIG. 22 illustrates a vehicle or an autonomous driving vehicle applied to the present disclosure.

Examples of Vehicles or Autonomous Vehicles to which the Present Disclosure is Applied FIG. 22 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 21, respectively.

The antenna unit 108 may be composed of a plurality of distributed antennas distributed in a vehicle. A location of a distributed antenna disposed in a vehicle may be different depending on the vehicle. A reference point for indicating the relative position of the distributed antenna in the vehicle may be predefined and recorded and maintained in a memory provided in the vehicle. In this case, the reference point may be defined differently depending on the vehicle.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). Also, the driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the acquired data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly acquired data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Here, wireless communication technologies implemented in the wireless devices (XXX, YYY) of the present specification may include LTE, NR, and 6G, as well as Narrowband Internet of Things for low power communication. At this time, for example, the NB-IoT technology may be an example of a Low Power Wide Area Network (LPWAN) technology, and may be implemented in standards such as LTE Cat NB1 and/or LTE Cat NB2, and is not limited to the above-described names. Additionally or alternatively, the wireless communication technology implemented in the wireless devices (XXX, YYY) of the present specification may perform communication based on LTE-M technology. In this case, as an example, the LTE-M technology may be an example of LPWAN technology, and may be referred to by various names such as eMTC (enhanced machine type communication). For example, LTE-M technology may be implemented in at least one of a variety of standards, such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described names. Additionally or alternatively, the wireless communication technology implemented in the wireless devices (XXX, YYY) of the present specification is at least one of ZigBee, Bluetooth, and Low Power Wide Area Network (LPWAN) considering low power communication, and is not limited to the above-described names. As an example, ZigBee technology can generate personal area networks (PANs) related to small/low-power digital communication based on various standards such as IEEE 802.15.4, and may be called various names.

The embodiments described above are those in which components and features of the present disclosure are combined in a predetermined form. Each component or feature should be considered optional unless explicitly stated otherwise. Each component or feature may be implemented in a form that is not combined with other components or features. In addition, it is also possible to constitute an embodiment of the present disclosure by combining some components and/or features. The order of operations described in the embodiments of the present disclosure may be changed. Some configurations or features of one embodiment may be included in other embodiments, or may be replaced with corresponding configurations or features of other embodiments. It is obvious that the embodiments may be configured by combining claims that do not have an explicit citation relationship in the claims or may be included as new claims by amendment after filing.

In this document, embodiments of the present disclosure have been mainly described based on a signal transmission/reception relationship between a terminal and a base station. Such a transmission/reception relationship is extended in the same/similar manner to signal transmission/reception between a terminal and a relay or a base station and a relay. A specific operation described as being performed by a base station in this document may be performed by its upper node in some cases. That is, it is obvious that various operations performed for communication with a terminal in a network comprising a plurality of network nodes including a base station may be performed by the base station or network nodes other than the base station. The base station may be replaced by terms such as a fixed station, a Node B, an eNode B (eNB), an access point, and the like. In addition, the terminal may be replaced with terms such as User Equipment (UE), Mobile Station (MS), Mobile Subscriber Station (MSS).

In a hardware configuration, the embodiments of the present disclosure may be achieved by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, a method according to embodiments of the present disclosure may be implemented in the form of a module, a procedure, a function, etc. Software code may be stored in a memory unit and executed by a processor. The memory unit is located at the interior or exterior of the processor and may transmit and receive data to and from the processor via various known means.

As described before, a detailed description has been given of preferred embodiments of the present disclosure so that those skilled in the art may implement and perform the present disclosure. While reference has been made above to the preferred embodiments of the present disclosure, those skilled in the art will understand that various modifications and alterations may be made to the present disclosure within the scope of the present disclosure. For example, those skilled in the art may use the components described in the foregoing embodiments in combination. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The above-described embodiments of the present disclosure can be applied to the server capable of performing the network-based positioning using various relays and a device capable of performing communication through sidelink.

What is claimed is:

1. A method comprising:

detecting, by a first device, a radio link failure (RLF) for a first user equipment (UE);

transmitting, by the first device, configuration information related to at least one positioning reference signal (PRS) resource to a second UE;

receiving, by the first device, first measurement information measured based on the at least one PRS resource from the second UE, wherein the first measurement information includes information for at least one of a reference signal time difference (RSTD) or a reference signal received power (RSRP);

based on (i) the detection of the RLF for the first UE and (ii) a reliability of an absolute position of the second UE estimated using the first measurement information being greater than a specific threshold, determining, by the first device, the second UE as an anchor node (AN) for positioning of the first UE, wherein the second UE is a relay UE that supports a connection between the first device and the first UE;

transmitting, by the first device, assistance information for a relative positioning scheme between the first UE and the second UE to the second UE; and receiving, by the first device, UE assistance information including measurements measured by the relative positioning scheme from the second UE.

2. The method according to claim 1, further comprising:

requesting capability information from the second UE; and receiving the capability information from the second UE, wherein the capability information includes capability information of the second UE and capability information of the first UE.

3. The method according to claim 2, further comprising:

determining the relative positioning scheme based on the capability information.

4. The method according to claim 3, wherein measurement information for the first UE is collected by the second UE based on positioning signaling information and sidelink (SL)-PRS received from the first UE through sidelink.

5. The method according to claim 4, wherein the positioning signaling information is included in sidelink control information (SCI), and wherein the SCI is transmitted in an NR-V2X service slot structure for a physical sidelink shared channel (PSSCH) and a physical sidelink control channel (PSCCH) or in a slot structure dedicated for new radio-vehicle to everything (NR-V2X) sidelink positioning.

6. The method according to claim 4, wherein the positioning signaling information includes at least one of:

a first UE ID (identifier), a first UE speed, a first UE heading, a Time of Arrival (ToA), Time of Flight (ToF), or relative position measured based on the SL-PRS received from the second.

7. A first device comprising:

a transceiver;

a processor connected to the transceiver, wherein the processor is configured to:

detect a radio link failure (RLF) for a first user equipment (UE);

transmit configuration information related to at least one positioning reference signal (PRS) resource to a second UE;

receive first measurement information measured based on the at least one PRS resource from the second UE, wherein the first measurement information includes information for at least one of a reference signal time difference (RSTD) or a reference signal received power (RSRP);

based on (i) the detection of the RLF for the first UE and (ii) a reliability of an absolute position of the second UE estimated using the first measurement information being greater than a specific threshold, determine the second UE as an anchor node (AN) for positioning of the first UE, wherein the second UE is a relay UE that supports a connection between the first device and the first UE;

transmitting, by the first device, assistance information for a relative positioning scheme between the first UE and the second UE to the second UE; and receiving, by the first device, UE-assistance information including measurements measured by the relative positioning scheme from the second UE.

8. The server according to claim 7, wherein the processor is configured to receive capability information from the second UE after requesting the capability information from the second UE, wherein the capability information includes capability information of the second UE and capability information of the first UE.

9. The server according to claim 8, wherein the processor is configured to:

determine the relative positioning scheme based on the capability information.

10. The server according to claim 9, wherein measurement information for the first UE is collected by the second UE based on positioning signaling information and sidelink (SL)-PRS received from the first UE through sidelink.

11. The server according to claim 10, wherein the positioning signaling information is included in sidelink control information (SCI), and wherein the SCI is transmitted in an NR-V2X service slot structure for a physical sidelink shared channel (PSSCH) and a physical sidelink control channel (PSCCH) or in a slot structure dedicated for new radio-vehicle to everything (NR-V2X) sidelink positioning.

12. The server according to claim 10, wherein the positioning signaling information includes at least one of:

a first UE ID (identifier), a first UE speed, a first UE heading, a Time of Arrival (ToA) or Time of Flight (ToF) or relative position measured based on the SL-PRS received from the second UE.

* * * * *